(12) United States Patent
Takeuchi et al.

(10) Patent No.: US 8,389,671 B2
(45) Date of Patent: Mar. 5, 2013

(54) RESIN COMPOSITION FOR OPTICAL MEMBER AND OPTICAL MEMBER OBTAINED FROM THE SAME

(75) Inventors: Motoharu Takeuchi, Tokyo (JP); Hiroshi Horikoshi, Tokyo (JP); Hiroaki Tanaka, Tokyo (JP); Hirohito Ishizuka, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 476 days.

(21) Appl. No.: 12/529,918

(22) PCT Filed: Mar. 11, 2008

(86) PCT No.: PCT/JP2008/054845
§ 371 (c)(1),
(2), (4) Date: Sep. 4, 2009

(87) PCT Pub. No.: WO2008/114765
PCT Pub. Date: Sep. 25, 2008

(65) Prior Publication Data
US 2010/0130661 A1    May 27, 2010

(30) Foreign Application Priority Data

Mar. 16, 2007  (JP) ................. 2007-068321
Apr. 9, 2007   (JP) ................. 2007-101443
Aug. 24, 2007  (JP) ................. 2007-218439
Aug. 29, 2007  (JP) ................. 2007-222283
Aug. 31, 2007  (JP) ................. 2007-225923
Sep. 14, 2007  (JP) ................. 2007-239091
Feb. 7, 2008   (JP) ................. 2008-027592

(51) Int. Cl.
*B32B 27/30* (2006.01)
*G02B 1/00* (2006.01)
*G02B 1/04* (2006.01)

(52) U.S. Cl. ........ 528/380; 524/419; 528/373; 528/377; 560/142; 560/188

(58) Field of Classification Search .................. 524/419, 524/380; 528/373, 377, 380; 560/142, 188
See application file for complete search history.

(56) References Cited

U.S. PATENT DOCUMENTS

| 4,315,067 A | 2/1982 | Gazard et al. |
| 4,414,081 A | 11/1983 | Eranian et al. |
| 2006/0167217 A1* | 7/2006 | Okada et al. ................. 528/380 |

FOREIGN PATENT DOCUMENTS

| FR | 2 630 744 | 11/1989 |
| GB | 968 424 A | 9/1964 |
| JP | 57-059920 | 4/1982 |
| JP | 60 065004 A | 4/1985 |
| JP | 04-288306 | 10/1992 |
| JP | 2005-225799 | 8/2005 |
| JP | 2006-233039 | 9/2006 |

OTHER PUBLICATIONS

Patent Abstracts of Japan of JP 57-059920 dated Apr. 10, 1982.
Patent Abstracts of Japan of JP 04-288306 dated Oct. 13, 1992.
Patent Abstracts of Japan of JP 2005-225799 dated Aug. 25, 2005.
Patent Abstracts of Japan of JP 2006-233039 dated Sep. 7, 2006.
English translation of JP 60 065004 A.
Extended European Search Report for corresponding European Application 11193589.6-2109.

* cited by examiner

*Primary Examiner* — James J Seidleck
*Assistant Examiner* — Deve E Valdez
(74) *Attorney, Agent, or Firm* — Ladas & Parry LLP

(57) ABSTRACT

The present invention can provide a composition for optical members, which contains (a) a compound having one or more of any group selected from the group consisting of an acryloyl group, a methacryloyl group, an allyl group and a vinyl group and one or more β-epithiopropyl groups in a molecule. In a preferable embodiment of the present invention, the composition for optical members further contains at least one compound selected from (b) a compound having one or more β-epithiopropyl groups in a molecule while having no polymerizable unsaturated bond group, (c) an inorganic compound having a sulfur atom and/or a selenium atom, (d) a compound having one or more thiol groups in a molecule, (e) a compound having one or more amino groups in a molecule while having no heterocyclic ring, and (f) a compound having one or more of at least one group selected from the group consisting of a vinyl group, an acryloyl group, a methacryloyl group and an allyl group in a molecule.

22 Claims, 1 Drawing Sheet

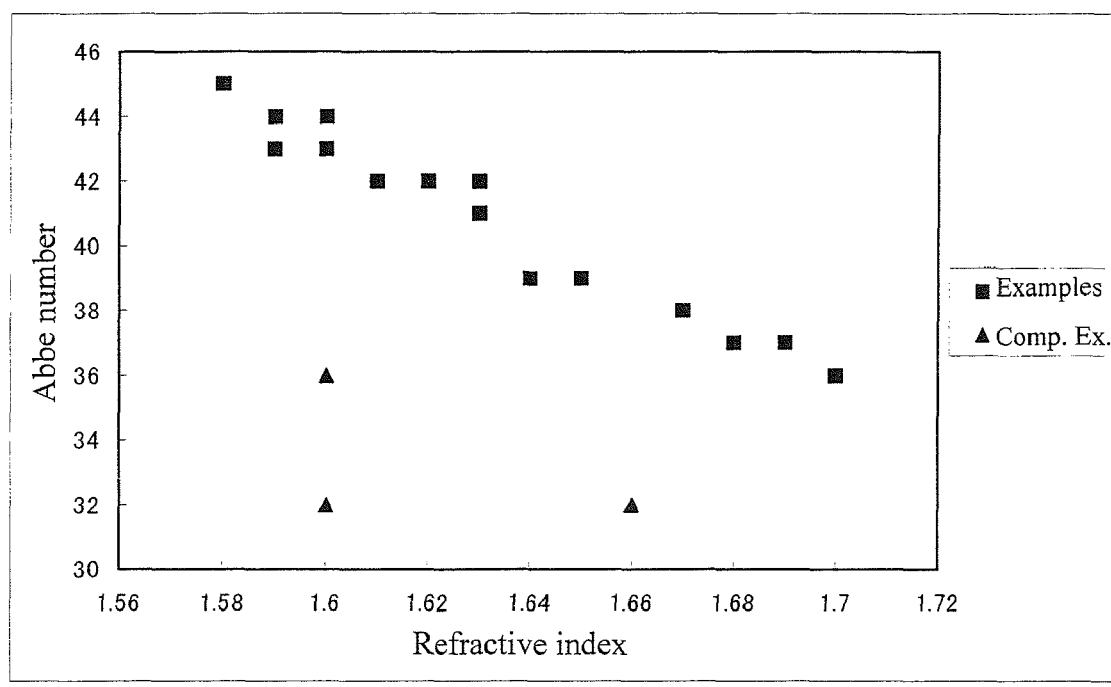

RESIN COMPOSITION FOR OPTICAL MEMBER AND OPTICAL MEMBER OBTAINED FROM THE SAME

TECHNICAL FIELD

The present invention relates to a resin composition for an optical member, and an optical member obtained using the same, such as a plastic lens, a prism, an optical fiber, an information recording substrate, a filter or the like. Among these, the present invention is preferably usable for the plastic lens.

BACKGROUND ART

Plastic materials are lightweight, highly tough and easy to be dyed, and so recently have been used for various types of optical members, especially for eyeglass lenses in a large amount. The optical members, especially the eyeglass lenses, are required to have good optical properties, and specifically to be high in both the refractive index and the Abbe number. A high refractive index allows the lenses to be thinner and more lightweight and to have a better appearance. A high Abbe number reduces the chromatic aberration of the lenses, and so alleviates the load on the eyes of a wearer of the eyeglasses to make the eyes less likely to be tired.

However, in general, as the refractive index increases, the Abbe number decreases. Conventionally, it has been studied to improve both the refractive index and the Abbe number. The best technique provided so far by these studies uses an episulfide compound, which achieves a refractive index of 1.7 and an Abbe number of 36 (Japanese Patent No. 3491660).

In addition to the high refractive index and Abbe number, the eyeglass lenses are also required to have physical properties such as high transparency, low degree of yellowing, high heat resistance and high strength, as well as a secondary processability of ease of dyeing. In order to fulfill these requirements in addition to the good optical properties, Japanese Patents Nos. 3465528, 3541707 and 3663861 and Japanese Laid-Open Patent Publication No. 11-318960 propose compositions.

Regarding the reactivity of an episulfide group, the episulfide group is homopolymerizable as a result of ring opening reaction progressing in a chained manner when a catalyst such as an amine compound or the like is used. Because of being homopolymerizable, the episulfide group does not require a large amount of curing agent unlike an epoxy resin and needs only a small amount of catalyst to be cured. However, since the episulfide group is not reactive with a variety of substances, the functional groups usable as a comonomer are limited. For example, the episulfide group is unlikely to react with a general-purpose resin monomer generally used, such as acrylic compounds, methacrylic compounds, (hereinafter, occasionally the acrylic compounds and the methacrylic compounds may be collectively referred to simply as "(meth) acrylic compounds"), allyl compounds and the like, are unlikely to react with an episulfide compound. For this reason, it has not been easy to obtain a resin from a composition formed of any of such compounds and an episulfide compound. Such an unlikeliness to react with a general-purpose resin has been an obstacle for expressing good properties of the episulfide compound.

Accordingly, it has been desired to apply the good properties of the episulfide compound to a general-purpose resin while making use of the homopolymerizability, by which the episulfide compound is curable with a small amount of catalyst.

Meanwhile, materials used for eyeglass lenses in the largest amount which have a refractive index of 1.6 still have an Abbe number of merely about 40, and materials having a refractive index of 1.66 still have an Abbe number of merely about 32. No material having better properties has been put into practice. As a result, the materials having a refractive index of 1.6 or more and less than 1.7 are inferior to the materials having a refractive index of 1.7, both in the refractive index and the Abbe number. The materials having a refractive index of 1.6 or more and less than 1.7 are used in the largest amount but do not have an improved Abbe number. For this reason, a material having a higher Abbe number has been desired.

From the point of view of an optical member, it is desirable that a material is adjustable in the refractive index in addition to be improved both in the refractive index and the Abbe number. The best technique provided so far by the studies made to produce such a material realizes a composition for an optical member containing an inorganic compound having a sulfur atom and/or a selenium atom and an episulfide compound. The refractive index of such a composition is adjustable by changing the composition ratio (Japanese Patent No. 3738817). This technique realizes a material having a refractive index of 1.7 or more and less than 1.8 while having a good Abbe number, the refractive index of which is adjustable.

By contrast, regarding the materials used for the eyeglass lenses in the largest amount which have a refractive index of 1.6 or more and less than 1.7, the refractive index thereof is determined in accordance with the compound used. Specifically, in the case of thiourethane materials formed of polythiol and polyisocyanate, which are mainly used as materials having a refractive index of 1.6 or more and less than 1.7, the molar ratio of an SH group and an NCO group needs to be exactly 1 and so the refractive index is not adjustable.

Accordingly, an optical material having a refractive index of 1.6 or more and less than around 1.7 while keeping the Abbe number high, the refractive index of which is arbitrarily adjustable, has been strongly desired. Specifically, a material having a refractive index of 1.6 or more and less than 1.7 and an Abbe number of 35, the refractive index of which is easily adjustable by changing, for example, the composition ratio, has been strongly desired.

Meanwhile, regarding high refractive index materials having a refractive index of 1.7 or more, the optical characteristics have been progressively improved owing to the episulfide compound. However, for middle refractive index materials having a refractive index of around 1.6, which are used for the eyeglass lenses in the largest amount, the Abbe number is still around 40. No material having better properties has been put into practice. Therefore, a material having a refractive index of around 1.6 and a higher Abbe number is desired. Such a material is also desired to have a higher transparency in order to be usable for an optical member.

Optical members, especially eyeglass lenses, are required to have a low specific gravity and a high refractive index, and also good physical properties such as a high heat resistance and a high strength. A low specific gravity allows the lens to be more lightweight, and a high refractive index allows the lens to be thinner. A high heat resistance and a high strength provide a high secondary processability and are also important from a point of view of safety or the like.

The refractive index of the materials used for eyeglass lenses in the largest amount today is around 1.6. Representative examples of such materials conventionally used include methacrylate compounds containing a bromine atom and thiourethane obtained from polythiol and polyisocyanate. Representative methacrylate compounds containing a bromine atom are described in Monthly Report of Japan Chemical Industry Association, the August 1987 issue, pp. 27-31. These materials have problems of being poor in the strength and the heat resistance, which are important elements of the eyeglass lenses, as well as problems of having a high specific gravity due to the large amount of bromine contained and being easy to be colored. The thiourethane materials are described in Monthly Report of Japan Chemical Industry Association, the February 1994 issue, pp. 8-11, Japanese Patent Publications for Opposition Nos. 4-58489 and 4-15249, and Japanese Laid-Open Patent Publications Nos. 8-271702, 9-110955 and 9-110956. These materials are improved in the strength but do not have a sufficient heat resistance. In addition, these materials also have problems of having a high specific gravity due to the large amount of sulfur atoms contained and generating a bad odor when being cut.

So far, lenses having a low specific gravity have been proposed in Japanese Laid-Open Patent Publications Nos. 5-215903, 5-307102, 5-307103 and 7-292043. However, the materials used for these lenses have a refractive index of merely up to about 1.5 and so are not suitable to reduce the lens thickness, and as a result do not realize a lightweight lens. These materials also have problems of being poor in the strength and the heat resistance. For these reasons, the lenses proposed in these publications are not widely used.

Accordingly, a lens material (an optical member) having a refractive index of around 1.6 and having good properties of a low specific gravity, a high strength and a high heat resistance has been desired.

DISCLOSURE OF THE INVENTION

The present invention has an object of solving at least one of the above-described problems of the conventional art. The present invention has an object of providing a resin composition for an optical member, which preferably has a refractive index in the range of 1.6 to around 1.7 and a high Abbe number, allows the refractive index thereof to be arbitrarily adjusted while keeping the high Abbe number, is superb in the light resistance, the transparency, the heat resistance and the strength, and has a low specific gravity.

Under the circumstances, the present inventors found, as a result of accumulating active studies, that a composition for an optical member which comprises, in a molecule, one or more of any group selected from the group consisting of an acryloyl group, a methacryloyl group, an allyl group and a vinyl group and one or more β-epithiopropyl groups solves at least one of the problems of the conventional art. This composition for an optical member contains, in a molecule, one or more ethylenic unsaturated bond groups and one or more β-epithiopropyl groups. Therefore, in order to completely react these two types of polymerizable functional groups to complete polymerization and curing, it is preferable to use a catalyst suitable to the reaction.

One embodiment of the present invention is directed to a composition for an optical member, comprising (a) a compound having one or more of any group selected from the group consisting of an acryloyl group, a methacryloyl group, an allyl group and a vinyl group and one or more β-epithiopropyl groups in a molecule.

A preferable embodiment of the present invention is directed to the above-described composition for an optical member, further comprising at least one compound selected from (b) a compound having one or more β-epithiopropyl groups in a molecule while having no polymerizable unsaturated bond group, (c) an inorganic compound having a sulfur atom and/or a selenium atom, (d) a compound having one or more thiol groups in a molecule, (e) a compound having one or more amino groups in a molecule while having no heterocyclic ring, and (f) a compound having one or more of at least one group selected from the group consisting of a vinyl group, an acryloyl group, a methacryloyl group and an allyl group in a molecule.

Another preferable embodiment of the present invention is directed to the above-described composition for an optical member, comprising (d) the compound having one or more thiol groups in a molecule as an indispensable component, and further comprising at least one compound selected from (b) the compound having one or more β-epithiopropyl groups in a molecule while having no polymerizable unsaturated bond group, (c) the inorganic compound having a sulfur atom and/or a selenium atom, (e) the compound having one or more amino groups in a molecule while having no heterocyclic ring, and (f) the compound having one or more of at least one group selected from the group consisting of a vinyl group, an acryloyl group, a methacryloyl group and an allyl group in a molecule.

Another preferable embodiment of the present invention is directed to the above-described composition for an optical member, wherein (a) the compound having one or more of any group selected from the group consisting of an acryloyl group, a methacryloyl group, an allyl group and a vinyl group and one or more β-epithiopropyl groups in a molecule is a compound represented by the following formula (1):

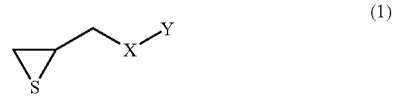

In the formula (1), X represents $O(CH_2)_n$, $S(CH_2)_n$ or $(CH_2)_n$; n represents an integer of 0 to 6; and Y represents an acryloyl group, a methacryloyl group, an allyl group or a vinyl group.

Another preferable embodiment of the present invention is directed to the above-described composition for an optical member, wherein (a) the compound having one or more of any group selected from the group consisting of an acryloyl group, a methacryloyl group, an allyl group and a vinyl group and one or more β-epithiopropyl groups in a molecule is thioglycidylmethacrylate represented by the following structural formula.

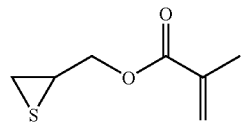

Another preferable embodiment of the present invention is directed to the above-described composition for an optical member, wherein (a) the compound having one or more of any group selected from the group consisting of an acryloyl group, a methacryloyl group, an allyl group and a vinyl group and one or more β-epithiopropyl groups in a molecule is allylthioglycidylether represented by the following structural formula.

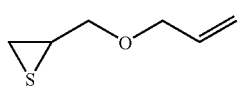

Another preferable embodiment of the present invention is directed to the above-described composition for an optical member, wherein (b) the compound having one or more β-epithiopropyl groups in a molecule while having no polymerizable unsaturated bond group is a compound represented by the following formula (2):

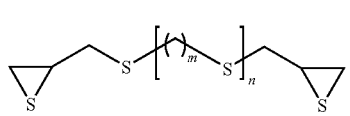

(2)

In the formula, m represents an integer of 0 to 4; and n represents an integer of 0 to 2.

Another preferable embodiment of the present invention is directed to the above-described composition for an optical member, wherein (b) the compound having one or more β-epithiopropyl groups in a molecule while having no polymerizable unsaturated bond group is bis(β-epithiopropyl)sulfide or bis(β-epithiopropyl)disulfide respectively represented by the following structural formulas.

Another preferable embodiment of the present invention is directed to the above-described composition for an optical member, wherein (c) the inorganic compound having a sulfur atom and/or a selenium atom is sulfur or carbon disulfide.

Another preferable embodiment of the present invention is directed to the above-described composition for an optical member, wherein (d) the compound having one or more thiol groups in a molecule is a compound having two or more and six or less thiol groups in a molecule.

Another preferable embodiment of the present invention is directed to the above-described composition for an optical member, wherein (d) the compound having one or more thiol groups in a molecule is at least one selected from the group consisting of bis(2-mercaptoethyl)sulfide, 2,5-bis(2-mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio)propane.

Another preferable embodiment of the present invention is directed to the above-described composition for an optical member, wherein (e) the compound having one or more amino groups in a molecule while having no heterocyclic ring is at least one selected from the group consisting of o-, m- or p-xylylenediamine, 1,2-bisaminomethylcyclohexane, 1,3-bis amino methylcyclohexane, 1,4-bisaminomethylcyclohexane, and bisaminomethylnorbornene.

Another preferable embodiment of the present invention is directed to the above-described composition for an optical member, wherein (f) the compound having one or more of at least one group selected from the group consisting of a vinyl group, an acryloyl group, a methacryloyl group and an allyl group in a molecule is at least one selected from the group consisting of styrene, α-methylstyrene, divinylbenzene, methyl(meth)acrylate, butyl(meth)acrylate, isobutyl(meth)acrylate, 2-hydroxyethyl(meth)acrylate, benzyl(meth)acrylate, glycidyl(meth)acrylate, 2-ethylhexyl(meth)acrylate, cyclohexyl(meth)acrylate, allyl(meth)acrylate, and a urethane(meth)acrylate compound having a (meth)acryloyl group.

Another preferable embodiment of the present invention is directed to the above-described composition for an optical member, which contains 1 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 99% by weight of (b) the compound having one or more β-epithiopropyl groups in a molecule while having no polymerizable unsaturated bond group.

Another preferable embodiment of the present invention is directed to the above-described composition for an optical member, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (c) the inorganic compound having a sulfur atom and/or a selenium atom.

Another preferable embodiment of the present invention is directed to the above-described composition for an optical member, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (d) the compound having one or more thiol groups in a molecule.

Another preferable embodiment of the present invention is directed to the above-described composition for an optical member, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (e) the compound having one or more amino groups in a molecule while having no heterocyclic ring.

Another preferable embodiment of the present invention is directed to the above-described composition for an optical member, which contains 1 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 99% by weight of (f) the compound having one or more of at least one group selected from the group consisting of a vinyl group, an acryloyl group, a methacryloyl group and an allyl group in a molecule.

Another preferable embodiment of the present invention is directed to the above-described composition for an optical member, which is obtained by preliminarily reacting (a) the compound having one or more of any group selected from the group consisting of an acryloyl group, a methacryloyl group, an allyl group and a vinyl group and one or more β-epithiopropyl groups in a molecule and (c) the inorganic compound having a sulfur atom and/or a selenium atom in the presence of an imidazole-based compound or a phosphine-based compound such that 10% or more and 90% or less of the inorganic compound having a sulfur atom and/or a selenium atom is reacted.

Another embodiment of the present invention is directed to an optical member obtained by polymerizing and curing the composition for an optical member according to claim 1 in the presence of a curing catalyst.

A preferable embodiment of the present invention is directed to the above-described optical member, wherein the curing catalyst is at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, metal halides, peroxides, and azo compounds.

Another preferable embodiment of the present invention is directed to the above-described optical member, wherein the curing catalyst is a combination of at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides; and at least one compound selected from peroxides and azo compounds.

Another preferable embodiment of the present invention is directed to the above-described optical member, wherein the curing catalyst is contained in an amount of 0.002 parts by weight to 6 parts by weight with respect to 100 parts by weight of the compound for an optical member according to any one of the above claims.

BRIEF DESCRIPTION OF THE DRAWINGS

FIG. 1 is a graph showing the relationship between the refractive index and the Abbe number of optical members obtained in Examples 1 through 24 and Comparative Examples 1, 2 and 7.

BEST MODE FOR CARRYING OUT THE INVENTION

Hereinafter, the present invention will be described in more detail.

According to the present invention, (a) a compound having one or more of any group selected from the group consisting of an acryloyl group, a methacryloyl group, an allyl group and a vinyl group and one or more β-epithiopropyl groups in a molecule encompasses all the compounds which fulfill this condition. Specific examples thereof include, but not limited to, any compound represented by the following formula (1), 2-, 3- or 4-(β-epithiopropylthiomethyl)styrene, 2-, 3- or 4-(β-epithiopropyloxymethyl)styrene, 2-, 3- or 4-(β-epithiopropylthio)styrene, 2-, 3- or 4-(β-epithiopropyloxy)styrene, and the like.

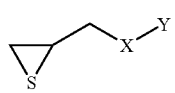

(1)

In the formula (1), X represents $O(CH_2)_n$, $S(CH_2)_n$ or $(CH_2)_n$; and n represents an integer of 0 to 6. Y represents an acryloyl group, a methacryloyl group, an allyl group or a vinyl group.

Among the compounds represented by the formula (1), preferable compounds are those in which n is 0, and more preferable compounds are those in which X is O (oxygen atom) or S (sulfur atom) and Y is a methacryloyl group or an allyl group. Still more preferable compounds are thioglycidylmethacrylate (in the formula (1), X is O and Y is a methacryloyl group), an allylthioglycidylether (in the formula (1), X is O and Y is an allyl group), thioglycidylthiomethacrylate (in the formula (1), X is S and Y is a methacryloyl group), and allylthioglycidylthioether (in the formula (1), X is S and Y is an allyl group), which are respectively represented by the following structural formulas.

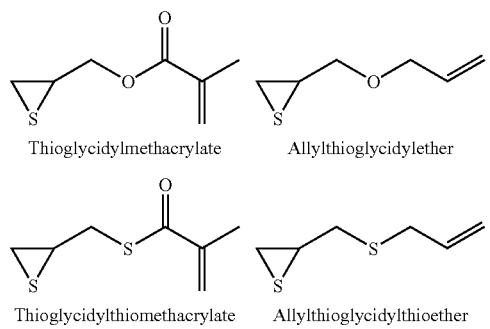

Thioglycidylmethacrylate  Allylthioglycidylether

Thioglycidylthiomethacrylate  Allylthioglycidylthioether

Specific examples are shown above, but the (a) compound is not limited to these, and the compounds may be used independently or as a mixture of two or more.

(b) a compound having one or more β-epithiopropyl groups in a molecule while having no polymerizable unsaturated bond group include any compound having a chained structure represented by the following formula (2), any compound having a ring structure represented by the following formula (3), and any compound having a branched structure represented by the following formula (4) or (5). These compounds may be used independently or as a mixture of two or more.

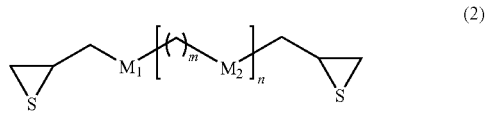

(2)

In the formula, $M_1$ and $M_2$ independently represent O or S. m represents an integer of 0 to 4, and n represents an integer of 0 to 2.

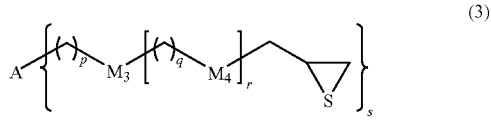

(3)

In the formula, $M_3$ and $M_4$ independently represent O or S. p represents an integer of 0 to 2, q represents an integer of 0 to 4, r represents an integer of 0 to 2, and s represents an integer of 1 to 4. A represents a ring structure represented by any of the following structures.

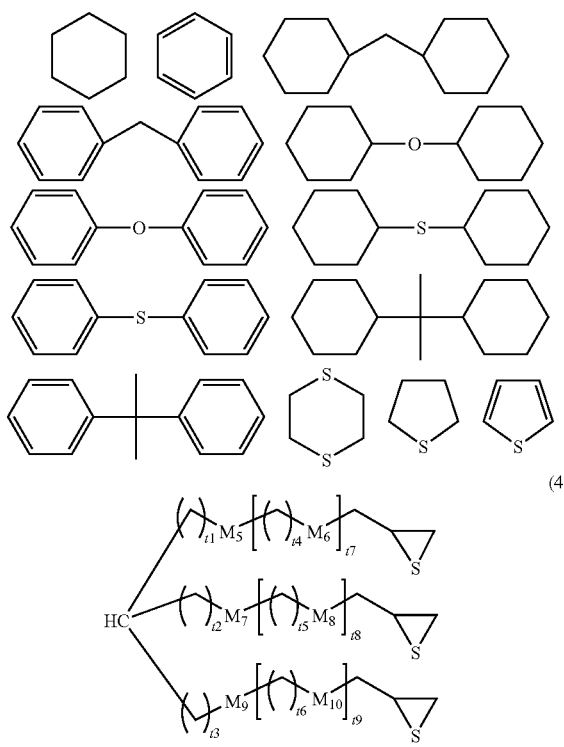

(4)

In the formula, $M_5$ and $M_6$ independently represent O or S. t1 through t3 independently represent an integer of 0 to 2, t4 through t6 independently represent an integer of 0 to 4, and t7 through t9 independently represent an integer of 0 to 2.

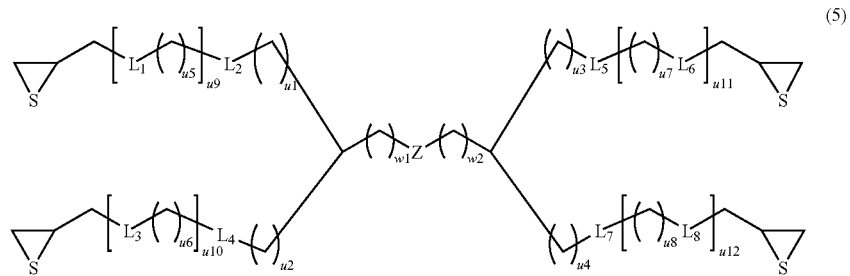

(5)

In the formula, $L_1$ through $L_8$ independently represent O or S. Z represents S or $CH_2$. u1 through u4 independently represent an integer of 0 to 2, u5 through u8 independently represent an integer of 0 to 4, u9 through u12 independently represent an integer of 0 to 2, and w1 and w2 independently represent an integer of 0 to 2.

Among these, preferable compounds are those represented by the formula (2) or (3), and more preferable compounds are those represented by the formula (2) where $M_1$ and $M_2$ are S, i.e., compounds represented by the following formula (6). Specific examples thereof include bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, bis(β-epithiopropylthioethyl)sulfide, 2,5-bis(β-epithiopropylthiomethyl)-1,4-dithiane, and the like. Among these, more preferable compounds are bis(β-epithiopropyl)sulfide and bis(β-epithiopropyl)disulfide respectively represented by the following structural formulas. The most preferable compound is bis(β-epithiopropyl)sulfide.

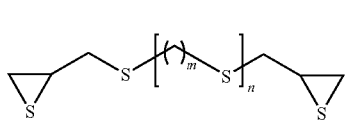

(6)

In the formula, m represents an integer of 0 to 4, and n represents an integer of 0 to 2.

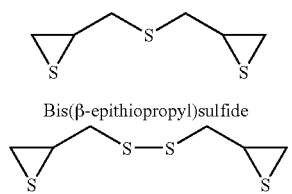

Bis(β-epithiopropyl)sulfide

Bis(β-epithiopropyl)disulfide

The mixing ratio of (a) a compound having one or more of any group selected from the group consisting of an acryloyl group, a methacryloyl group, an allyl group and a vinyl group and one or more β-epithiopropyl groups in a molecule and (b) a compound having one or more β-epithiopropyl groups in a molecule while having no polymerizable unsaturated bond group is arbitrary. The composition ratio of (a) a compound having one or more of any group selected from the group consisting of an acryloyl group, a methacryloyl group, an allyl group and a vinyl group and one or more β-epithiopropyl groups in a molecule is preferably in the range of 1 to 99.9% by weight, more preferably in the range of 10 to 90% by weight, and especially preferably in the range of 20 to 80% by weight. Meanwhile, the composition ratio of (b) a compound having one or more β-epithiopropyl groups in a molecule while having no polymerizable unsaturated bond group is preferably in the range of 0.1 to 99% by weight, more preferably in the range of 10 to 90% by weight, and especially preferably in the range of 20 to 80% by weight.

Specific examples of (c) an inorganic compound having a sulfur atom and/or a selenium atom include sulfur; hydrogen sulfide; carbon disulfide; carbon selenosulfide; ammonium sulfide; sulfur oxides such as sulfur dioxide, sulfur trioxide and the like; thiocarbonates; sulfuric acid and salts thereof; hydrogen sulfates; sulfites; hyposulfites; persulfates; thiocyanates; thiosulfates; halides such as sulfur dichloride, thionylchloride, thiophosgene and the like; boron sulfide; nitrogen sulfide; silicon sulfide; phosphorus sulfide; selenium sulfide; metal sulfides; metal hydrosulfides; selenium; hydrogen selenide; selenium dioxide; carbon diselenide; ammonium selenide; selenium oxides such as selenium dioxide and the like; selenic acid and salts thereof; selenious acid and salts thereof; hydrogenselenates; selenosulfate and salts thereof; selenopyrosulfate and salts thereof, halides such as selenium tetrabromide, selenium oxychloride and the like; selenocyanates; boron selenide; phosphorus selenide; arsenic selenide; metal selenides; and the like.

Specific examples are shown above, but the (c) compound is not limited to these, and the compounds may be used independently or as a mixture of two or more.

Among these, preferable compounds are sulfur, carbon disulfide, phosphorus sulfide, selenium sulfide, metal sulfides, metal hydrosulfides, selenium, carbon diselenide, phosphorus selenide, and metal selenides. More preferable compounds are sulfur, carbon disulfide, selenium sulfide, selenium, and carbon diselenide. Especially preferable compounds are sulfur and carbon disulfide, and the most preferable compound is sulfur.

The mixing ratio of (a) a compound having one or more of any group selected from the group consisting of an acryloyl group, a methacryloyl group, an allyl group and a vinyl group and one or more β-epithiopropyl groups in a molecule and (c) an inorganic compound having a sulfur atom and/or a selenium atom is arbitrary. The composition ratio of (a) a compound having one or more of any group selected from the group consisting of an acryloyl group, a methacryloyl group, an allyl group and a vinyl group and one or more β-epithiopropyl groups in a molecule is preferably in the range of 50 to 99.9% by weight, more preferably in the range of 70 to 99.9% by weight, and especially preferably in the range of 80 to 99% by weight. Meanwhile, the composition ratio of (c) an inorganic compound having a sulfur atom and/or a selenium atom is preferably in the range of 0.1 to 50% by weight, more preferably in the range of 0.1 to 30% by weight, and especially preferably in the range of 1 to 20% by weight.

(d) A compound having one or more thiol groups in a molecule encompasses all the compounds which fulfill this condition. Compounds having two or more and six or less thiol groups in a molecule are preferable. Specific examples thereof include thiophenols, thiols, mercaptoalcohols, hydroxythiophenols, and the like.

Examples of the thiophenols include thiophenol, 4-tert-butylthiophenol, 2-methylthiophenol, 3-methylthiophenol, 4-methylthiophenol, o-dimercaptobenzene, m-dimercaptobenzene, p-dimercaptobenzene, 1,3,5-trimercaptobenzene, and the like.

Examples of the thiols include monothiols such as methylmercaptan, ethylmercaptan, n-propylmercaptan, n-butylmercaptan, allylmercaptan, n-hexylmercaptan, n-octylmercaptan, n-decylmercaptan, n-dodecylmercaptan, n-tetradecylmercaptan, n-hexadecylmercaptan, n-octadecylmercaptan, cyclohexylmercaptan, isopropylmercaptan, tert-butylmercaptan, tert-nonylmercaptan, tert-dodecylmercaptan, benzylmercaptan, 4-chlorobenzylmercaptan, methylthioglycolate, ethylthioglycolate, n-butylthioglycolate, n-octylthioglycolate, methyl(3-mercaptopropionate), ethyl(3-mercaptopropionate), 3-methoxybutyl(3-mercaptopropionate), n-butyl(3-mercaptopropionate), 2-ethylhexyl(3-mercaptopropionate), n-octyl(3-mercaptopropionate), etc.; polyhydric thiols such as methanedithiol, 1,2-dimercaptoethane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptopropane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, ethyleneglycolbis(2-mercapto acetate), ethyleneglycolbis(3-mercaptopropionate), 1,4-butanediolbis(2-mercaptoacetate), 1,4-butanediolbis(3-mercaptopropionate), trimethylolpropanetris(2-mercaptoacetate), trimethylolpropanetris(3-mercaptopropionate), pentaerythritoltetrakis(2-mercaptoacetate), pentaerythritoltetrakis(3-mercaptopropionate), 1,1-dimercaptocyclohexane, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(mercaptoethyl)-1,4-dithiane, 1,2-bis(mercaptomethyl)benzene, 1,3-bis(mercaptomethyl)benzene, 1,4-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, etc.; and the like.

Examples of the mercaptoalcohols include 2-mercaptoethanol, 2-mercaptopropanol, 3-mercaptopropanol, 2-hydroxypropylmercaptan, 2-phenyl-2-mercaptoethanol, 2-phenyl-2-hydroxyethylmercaptan, 3-mercapto-1,2-propanediol, 2-mercapto-1,3-propanediol, 2,3-dimercaptopropanol, 1,3-dimercapto-2-propanol, 2,2-dimethylpropane-1,3-diol, glyceryldithioglycolate, and the like.

Examples of the hydroxythiophenols include 2-hydroxythiophenol, 3-hydroxythiophenol, 4-hydroxythiophenol, and the like.

Specific examples are shown above, but the (d) compound is not limited to these, and the compounds may be used independently or as a mixture of two or more.

Among these, preferable compounds are polyhydric thiols; especially, compounds having two or more and six or less thiol groups in a molecule. Specific examples thereof include bis(2-mercaptoethyl)sulfide, pentaerythritoltetrakis(2-mercaptoacetate), pentaerythritoltetrakis(3-mercaptopropionate), 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, 1,3-bis(mercaptomethyl)benzene, 1,4-bis(mercaptomethyl)benzene, and the like. Specific examples of the most preferable compounds include bis(2-mercaptoethyl)sulfide, 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio)propane.

The mixing ratio of (a) a compound having one or more of any group selected from the group consisting of an acryloyl group, a methacryloyl group, an allyl group and a vinyl group and one or more β-epithiopropyl groups in a molecule and (d) a compound having one or more thiol groups in a molecule is arbitrary. The composition ratio of (a) a compound having one or more of any group selected from the group consisting of an acryloyl group, a methacryloyl group, an allyl group and a vinyl group and one or more β-epithiopropyl groups in a molecule is preferably in the range of 50 to 99.9% by weight, more preferably in the range of 70 to 99% by weight, and especially preferably in the range of 80 to 99% by weight. Meanwhile, the composition ratio of (d) a compound having one or more thiol groups in a molecule is preferably in the range of 0.1 to 50% by weight, more preferably in the range of 1 to 30% by weight, and especially preferably in the range of 1 to 20% by weight.

In a preferable embodiment of the present invention, (a) a compound having one or more of any group selected from the group consisting of an acryloyl group, a methacryloyl group, an allyl group and a vinyl group and one or more β-epithiopropyl groups in a molecule and (d) a compound having one or more thiol groups in a molecule are contained as indispensable elements, and at least one compound selected from (b) a compound having one or more β-epithiopropyl groups in a molecule while having no polymerizable unsaturated bond group, (c) an inorganic compound having a sulfur atom and/or a selenium atom, (e) a compound having one or more amino groups in a molecule while having no heterocyclic ring, and (f) a compound having one or more of at least one group selected from the group consisting of a vinyl group, an acryloyl group, a methacryloyl group and an allyl group in a molecule is further contained. The mixing ratio of the (a) compound, the (d) compound and the other compound(s) (at least one of the (b), (c), (e) and (f) compounds) is arbitrary. The composition ratio of the (a) compound is preferably in the range of 1 to 99% by weight, more preferably in the range of 10 to 90% by weight, and especially preferably in the range of 10 to 80% by weight. The composition ratio of the (d) compound is preferably in the range of 0.5 to 9% by weight, more preferably in the range of 1 to 5% by weight, and especially preferably in the range of 1 to 5% by weight. The composition ratio of the other compound(s) (at least one of the (b), (c), (e) and (f) compounds) is preferably in the range of 0.5 to 90% by weight, more preferably in the range of 9 to 85% by weight, and especially preferably in the range of 19 to 85% by weight.

(e) A compound having one or more amino groups in a molecule while having no heterocyclic ring encompasses all the compounds which fulfill this condition. Specific examples thereof are as follows.

Primary amines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylylamine, 1,2-dimethylhexylamine, 3-pentylamine, 2-ethylhexylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentanone, aminocyclohexane, aminonorbornene, aminomethylcyclohexane, aminobenzene, benzylamine, phenetylamine, α-phenylethylamine, naphtylamine, and the like.

Primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis(3-aminopropyl)ether, 1,2-bis(3-aminopropoxy)ethane, 1,3-bis(3-aminopropoxy)-2,2'-dimethylpropane, aminoethanolamine, 1,2-, 1,3- or 1,4-bisaminocyclohexane, 1,2-, 1,3- or 1,4-bisaminomethylcyclohexane, 1,3- or 1,4-bisaminoethylcyclohexane, 1,3- or 1,4-bisaminopropylcyclohexane, 4,4'-diaminodicyclohexylmethane, isophoronediamine, menthanediamine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, o-, m- or p-xylylenediamine, bisaminomethylnorbornene, 1,5- or 2,6-naphthalenediamine, benzidine, 4,4'-bis(o-toluidine), dianisidine, 4,4'-diaminodiphenylmethane, 2,2'-(4,4'-diaminodiphenyl)propane, 4,4'-diaminodiphenylether, 4,4'-diaminodiphenylsulfone, 4,4'-diaminoditolylsulfone, diethylenetriamine, iminobispropylamine, methyliminobispropylamine, bis(hexamethylene)triamine, triethylenetetramine, tetraethylenepentamine, pentaethylenehexamine, bis(3,4-diaminophenyl)sulfone, 4,4'-thiodianiline, methylenebis(o-chloroaniline), and the like.

Secondary amines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diphenylamine, dibenzylamine, methylbenzylamine, dinaphtylamine, N-methylaniline, N-ethylaniline, and the like.

Secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, tetramethylguanidine, and the like.

Tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tripentylamine, tri-3-pentylamine, tri-n-hexylamine, tri-n-octylamine, tri-2-ethylhexylamine, tridodecylamine, trilaurylamine, tricyclohexylamine, N,N-dimethylhexylamine, N-methyldihexylamine, N,N-dimethylcyclohexylamine, N-methyldicyclohexylamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, and the like.

Tertiary polyamines such as tetramethylethylenediamine, hexamethylenetetramine, N,N,N',N'-tetramethyl-1,3-dibutaneamine, 2-dimethylamino-2-hydroxypropane, diethylaminoethanol, N,N,N-tris(3-dimethylaminopropyl)amine, 2,4,6-tris(N,N-dimethylaminomethyl)phenol, and the like.

Specific examples are shown above, but the (e) compound is not limited to these, and the compounds may be used independently or as a mixture of two or more. Among these, preferable compounds are amine compounds having one or two primary or secondary amino groups in a molecule. More preferable specific examples of such amine compounds are propylamine, aminocyclohexane, aminonorbornene, aminomethylcyclohexane, aminobenzene, benzylamine, phenetylamine, α-phenylethylamine, naphtylamine, 1,2-, 1,3- or 1,4-bisaminocyclohexane, 1,2-, 1,3- or 1,4-bisaminomethylcyclohexane, 1,3- or 1,4-bisaminoethylcyclohexane, 1,3- or 1,4-bisaminopropylcyclohexane, 4,4'-diaminodicyclohexylmethane, isophoronediamine, menthanediamine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, o-, m- or p-xylylenediamine, bisaminomethylnorbornene, 1,5- or 2,6-naphthalenediamine, benzidine, 4,4'-bis(o-toluidine), dianisidine, 4,4'-diaminodiphenylmethane, 2,2'-(4,4'-diaminodiphenyl)propane, 4,4'-diaminodiphenylether, 4,4'-diaminodiphenylsulfone, 4,4'-diaminoditolylsulfone, bis(3,4-diaminophenyl)sulfone, diphenylamine, methylbenzylamine, and dinaphtylamine. Especially preferable compounds are propylamine, o-, m- or p-xylylenediamine, 1,2-, 1,3- or 1,4-bisaminomethylcyclohexane, and bisaminomethylnorbornene. The most preferable compounds are propylamine, m-xylylenediamine, 1,3-bisaminomethylcyclohexane, and bisaminomethylnorbornene.

The mixing ratio of (a) a compound having one or more of any group selected from the group consisting of an acryloyl group, a methacryloyl group, an allyl group and a vinyl group and one or more β-epithiopropyl groups in a molecule and (e) a compound having one or more amino groups in a molecule while having no heterocyclic ring is arbitrary. The composition ratio of (a) a compound having one or more of any group selected from the group consisting of an acryloyl group, a methacryloyl group, an allyl group and a vinyl group and one or more β-epithiopropyl groups in a molecule is preferably in the range of 50 to 99.9% by weight, more preferably in the range of 70 to 90% by weight, and especially preferably in the range of 80 to 99% by weight. Meanwhile, the composition ratio of (e) a compound having one or more amino groups in a molecule while having no heterocyclic ring is preferably in the range of 0.1 to 50% by weight, more preferably in the range of 1 to 30% by weight, and especially preferably in the range of 1 to 20% by weight.

Examples of (f) a compound having one or more of at least one group selected from the group consisting of a vinyl group, an acryloyl group, a methacryloyl group and an allyl group in a molecule are as follows.

Examples of the compound having a vinyl group include styrene, 2-methylstyrene, 3-methylstyrene, 4-methylstyrene, α-methylstyrene, α-methylstyrenedimer, 2,4,6-trimethylstyrene, 4-tert-butylstyrene, vinylphenol, vinylthiophenol, 2-chlorostyrene, 3-chlorostyrene, 4-chlorostyrene, 3-chloromethylstyrene, 4-chloromethyl styrene, 2-bromostyrene, 3-bromostyrene, 4-bromostyrene, 3-bromomethylstyrene, 4-bromomethylstyrene, 4-aminostyrene, 3-cyanomethylstyrene, 4-cyano methyl styrene, divinylbenzene, trivinylbenzene, 4-vinylbiphenyl, 2,2'-divinylbiphenyl, 4,4'-divinylbiphenyl, 2,2-bis(4-vinylphenyl)propane, bis(4-vinylphenyl) ether, vinylnaphthalene, divinylnaphthalene, and the like.

Among theses, preferable compounds are styrene, 2-methylstyrene, 3-methylstyrene, 4-methylstyrene, α-methylstyrene, α-methylstyrenedimer, 2,4,6-trimethylstyrene, 4-tert-butylstyrene, divinylbenzene, and trivinylbenzene. More preferable compounds are styrene, 2-methylstyrene, 3-methylstyrene, 4-methylstyrene, α-methylstyrene, 4-tert-butylstyrene, and divinylbenzene. Still more preferable compounds are styrene, α-methylstyrene, and divinylbenzene. The most preferable compound is styrene.

Specific examples of the compound having an acryloyl group include acrylic compounds such as methylacrylate, ethylacrylate, propylacrylate, butylacrylate, cyclohexylacrylate, 2-hydroxyethylacrylate, 2-hydroxypropylacrylate, 3-hydroxypropylacrylate, 4-hydroxybutylacrylate, glycidylacrylate, isobutylacrylate, tert-butylacrylate, isooctylacrylate, 2-ethylhexylacrylate, 2-methoxyethylacrylate, methoxytriethyleneglycolacrylate, 2-ethoxyethylacrylate, allylacrylate, tetrahydrofurfurylacrylate, benzylacrylate, phenoxyethylacrylate, 3-phenoxy-2-hydroxypropylacrylate, trimethylolpropanemonoacrylate, 2-hydroxyethylisocyanuratemonoacrylate, 2-hydroxyethylisocyanuratediacrylate, 2-hydroxyethylcyanuratemonoacrylate, 2-hydroxyethylcyanuratediacrylate, ethyleneglycoldiacrylate, diethyleneglycoldiacrylate, 1,3-butyleneglycoldiacrylate, triethyleneglycoldiacrylate, polyethyleneglycoldiacrylate, propyleneglycoldiacrylate, 1,3-propanedioldiacrylate, 1,3-butanedioldiacrylate, 1,4-butanedioldiacrylate, 1,6-hexanedioldiacrylate, 1,9-nonanedioldiacrylate, 2-n-butyl-2-ethyl-1,3-propanedioldiacrylate, neopentylglycoldiacrylate, dipropyleneglycoldiacrylate, tripropyleneglycoldiacrylate, polypropyleneglycoldiacrylate, tetraethyleneglycoldiacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydroxy-3-acryloxypropoxy) phenyl]propane, 2,2-bis[4-(acryloxypolyethoxy)phenyl] propane, trimethylolpropanetriacrylate, pentaerythritolmonoacrylate, pentaerythritoldiacrylate, pentaerythritoltriacrylate, pentaerythritoltetraacrylate, hexaacrylate of bis(2,2,2-trimethylolethyl)ether, etc.; and the like.

Specific examples of the compound having a methacryloyl group include compounds obtained as a result of the acryloyl group of the acrylic compounds listed above being partially or entirely substituted with a methacryloyl group.

Specific examples are shown above, but the (f) compound having one or more of at least one group selected from the group consisting of a vinyl group, an acryloyl group and a methacryloyl group is not limited to these, and the compounds may be used independently or as a mixture of two or more. Among these, preferable compounds are methyl(meth) acrylate, butyl(meth)acrylate, isobutyl(meth)acrylate, 2-hydroxyethyl(meth)acrylate, benzyl(meth)acrylate, glycidyl (meth)acrylate, 2-ethylhexyl(meth)acrylate, cyclohexyl (meth)acrylate, and allyl(meth)acrylate.

In addition, urethane(meth)acrylate compounds having a (meth)acryloyl group obtained by an existing synthesis method are preferable.

Specific examples thereof include compounds obtained by first reacting polyisocyanate and polyol and then reacting the reaction product with hydroxy(meth)acrylate, compounds obtained by first reacting polyisocyanate and hydroxy(meth) acrylate and then reacting the reaction product with polyol, and the like. Preferable compounds are those obtained by first reacting bifunctional polyisocyanate and bifunctional polyol and then reacting the reaction product with pentaerythritoltri (meth)acrylate. As a reaction catalyst, a known urethanization catalyst such as dibutyltindilaurate or the like is usable.

Examples of the usable hydroxy(meth)acrylate include 2-hydroxyethyl(meth)acrylate, hydroxymethyl(meth)acrylate, 2-hydroxypropyl(meth)acrylate, glycidoldi(meth)allylate, triglyceroldi(meth)acrylate, pentaerythritoltri(meth) acrylate, dipentaerythritolpenta(meth)acrylate, dipentaerythritoltetra(meth)acrylate, dipentaerythritoltri (meth)acrylate, dipentaerythritoldi(meth)acrylate, trimethylolpropanedi(meth)acrylate, epoxyacrylate, and the like. A preferable compound is pentaerythritoltri(meth)acrylate. These hydroxy(meth)acrylates may be used independently or as a mixture of two or more.

Examples of the usable polyisocyanate include polyisocyanates having two or more isocyanate groups in a molecule. Specific examples thereof include aromatic compounds such as tolylenediisocyanate, diphenylmethanediisocyanate, polymethylenepolyphenylpolyisocyanate, toluidinediisocyanate, naphthalinediisocyanate, and the like; hexamethylenediisocyanate; isophoronediisocyanate; xylylenediisocyanate; water-added xylylenediisocyanate; dicyclohexylmethanediisocyanate; and the like. These compounds may be used independently or as a mixture of two or more.

Examples of the usable polyol include polyols having two or more hydroxyl groups in a molecule. Specific examples thereof include poly(propyleneoxide)diol, poly(propyleneoxide)triol, copoly(ethyleneoxide-propyleneoxide)diol, poly(tetramethyleneoxide)diol, bisphenol A ethoxide, bisphenol S ethoxide, spiroglycol, caprolactone denatured diol, carbonatediol, trimethylolpropane, pentaerythritol, and the like. These compounds may be used independently or as a mixture of two or more.

Most of these compounds are commercially available and easily obtainable. Specific examples of the commercially available products include Shiko UV-1400B, Shiko UV-1700B, Shiko UV-6300B, Shiko UV-7510B, Shiko UV-7600B, Shiko UV-7605B, Shiko UV-7610B, Shiko UV-7620EA, Shiko UV-7630B, and Shiko UV-7640B made by The Nippon Synthetic Chemical Industry Co., Ltd.; Artresin UN-9000H, Artresin UN-3320HA, Artresin UN-3320HC, Artresin UN-3320HS, and Artresin UN-901T made by Negami Chemical Industrial Co., Ltd.; NK Oligo U-4HA, NK Oligo U-6HA, NK Oligo U-6LPA, NK Oligo U-15HA, NK Oligo UA-32P, NK Oligo U-324A, and NK Oligo U-6H made by Shin-Nakamura Chemical Co., Ltd.; EBECRYL 1290, EBECRYL 1290K, EBECRYL 5129, EBECRYL 210, EBECRYL 220, EBECRYL 284, EBECRYL 8210, EBECRYL 8402, and EBECRYL 9260 made by Daicel-Cytec Company Ltd.; Beamset 575 made by Arakawa Chemical Industries, Ltd.; M-313 and M-315 made by Toagose Co., Ltd.; and the like. Among these, especially preferable products are Shiko UV-7510B and Shiko UV-7605B made by The Nippon Synthetic Chemical Industry Co., Ltd.; EBECRYL 210, EBECRYL 220, EBECRYL 284, EBECRYL 8210 and EBECRYL 8402 made by Daicel-Cytec Company Ltd.; and M-313 made by Toagose Co., Ltd.

Specific example of the compound having an allyl group include allyldiglycolcarbonate, diallylphthalate, diallylterephthalate, diallylisophthalate, diallylchlorendate, allyl cyanate, allylamine, diallylamine, allyl cyanoacetate, allylalcohol, allylglycol, allylchloride, allylbromide, allylglycidylether, allylphenyl selenide, 1-allyl-3,4-dimethoxybenzene, allylaldehyde, 1-allylimidazole, and the like. Among these, preferable compounds are allyldiglycolcarbonate, diallylphthalate, diallylterephthalate, and diallylisophthalate.

Specific examples are shown above, but the (f) compound having one or more allyl groups is not limited to these, and the compounds may be used independently or as a mixture of two or more. Among the above-listed compounds, compounds having a (meth)acryloyl group are preferable.

The mixing ratio of (a) a compound having one or more of any group selected from the group consisting of an acryloyl group, a methacryloyl group, an allyl group and a vinyl group and one or more β-epithiopropyl groups in a molecule and (f) a compound having one or more of at least one group selected from the group consisting of a vinyl group, an acryloyl group, a methacryloyl group and an allyl group in a molecule is arbitrary. The composition ratio of (a) a compound having one or more of any group selected from the group consisting of an acryloyl group, a methacryloyl group, an allyl group and a vinyl group and one or more β-epithiopropyl groups in a molecule is preferably in the range of 1 to 99.9% by weight, and more preferably in the range of 10 to 90% by weight. Meanwhile, the composition ratio of (f) a compound having one or more of at least one group selected from the group consisting of a vinyl group, an acryloyl group, a methacryloyl group and an allyl group in a molecule is preferably in the range of 0.1 to 99% by weight, and more preferably in the range of 10 to 90% by weight.

In order to prepare a composition for an optical member, it is preferable to first preliminarily react (a) a compound having one or more of any group selected from the group consisting of an acryloyl group, a methacryloyl group, an allyl group and a vinyl group and one or more β-epithiopropyl groups in a molecule and (c) an inorganic compound having a sulfur atom and/or a selenium atom with each other in the presence of an imidazole-based compound or a phosphine-based compound such that 10% or more and 90% or less (it is assumed that 0% is reacted before the reaction) of (c) the inorganic compound having a sulfur atom and/or a selenium atom is reacted. Especially in the case where compounds in the composition for an optical member contain a solid component, which is not easy to handle, this preliminary reaction is effective. The preliminary reaction is conducted preferably at −10 to 120° C. for 0.1 to 240 hours, more preferably at 0 to 100° C. for 0.1 to 120 hours, and especially preferably at 20 to 80° C. for 0.1 to 60 hours. It is more preferable that 20% or more and 90% or less of (c) the inorganic compound having a sulfur atom and/or a selenium atom is reacted by the preliminary reaction. The preliminary reaction may be conducted in the presence of a gas such as air, nitrogen, oxygen or the like in an arbitrary atmosphere such as under normal pressure or in a sealed state provided by an increased or decreased pressure.

A preferably usable curing catalyst according to the present invention is at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, metal halides, peroxides, and azo compounds.

Specific examples of the amines having a heterocyclic ring include various imidazoles such as imidazole, N-methylimidazole, N-methyl-2-mercaptoimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis(2-ethyl-4-methylimidazolyl)methane, adducts of alkylimidazole and isocyanuric acid, condensates of alkylimidazole and formaldehyde, and the like; and amidines such as 1,8-diazabicyclo[5.4.0]undecene, 1,5-diazabicyclo[4.3.0]nonene, 5,6-dibutylamino-1,8-diazabicyclo[5.4.0]undecene, and the like. Imidazoles are preferable.

Specific examples of the phosphines include trimethylphosphine, triethylphosphine, triisopropylphosphine, tributylphosphine, tricyclohexylphosphine, trioctylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, dimethylphenylphosphine, diethylphenylphosphine, dicyclohexylphenylphosphine, diethylphenylphosphine, dicyclohexylphenylphosphine, ethyldiphenylphosphine, diphenylcyclohexylphosphine, chlorodiphenylphosphine, and the like. Triphenylphosphine and tributylphosphine are preferable.

Specific examples of the quaternary ammonium salts include tetramethylammoniumchloride, tetramethylammoniumbromide, tetramethylammoniumacetate, tetraethylammoniumchloride, tetraethylammoniumbromide, tetraethylammoniumacetate, tetra-n-butylammoniumfluoride, tetra-n-butylammoniumchloride, tetra-n-butylammoniumbromide, tetra-n-butylammoniumiodide, tetra-n-butylammoniumacetate, tetra-n-butylammoniumborohydride, tetra-n-butylammoniumhexafluorophosphite, tetra-n-butylammoniumhydrogensulphite, tetra-n-butylammoniumtetrafluoroborate, tetra-n-butylammoniumtetraphenylborate, tetra-n-butylammoniumparatoluenesulfonate, tetra-n-hexylammoniumchloride, tetra-n-hexylammoniumbromide, tetra-n-hexylammoniumacetate, tetra-n-octylammoniumchloride, tetra-n-octylammoniumbromide, tetra-n-octylammoniumacetate, trimethyl-n-octylammoniumchloride, trimethylbenzylammoniumchloride, trimethylbenzylammoniumbromide, triethyl-n-octylammoniumchloride, triethylbenzylammoniumchloride, triethylbenzylammoniumbromide, tri-n-butyl-n-octylammoniumchloride, tri-n-butylbenzylammoniumfluoride, tri-n-butylbenzylammoniumchloride, tri-n-butylbenzylammoniumbromide, tri-n-butylbenzylammoniumiodide, methyltriphenylammoniumchloride, methyltriphenylammoniumbromide, ethyltriphenylammoniumchloride, ethyltriphenylammoniumbromide, n-butyltriphenylammoniumchloride, n-butyltriphenylammoniumbromide, 1-methylpyridiniumbromide, 1-ethylpyridiniumbromide, 1-n-butylpyridiniumbromide, 1-n-hexylpyridiniumbromide, 1-n-octylpyridiniumbromide, 1-n-dodecylpyridiniumbromide, 1-phenylpyridiniumbromide, 1-methylpicoliniumbromide, 1-ethylpicoliniumbromide, 1-n-butylpicoliniumbromide, 1-n-hexylpicoliniumbromide, 1-n-octylpicoliniumbromide, 1-n-dodecylpicoliniumbromide, 1-phenylpicoliniumbromide, and the like. Tetra-n-butylammoniumbromide and triethylbenzylammoniumchloride are preferable.

Specific examples of the quaternary phosphonium salts include tetramethylphosphoniumchloride, tetramethylphosphoniumbromide, tetraethylphosphoniumchloride, tetraethylphosphoniumbromide, tetra-n-butylphosphoniumchloride, tetra-n-butylphosphoniumbromide, tetra-n-butylphosphoniumiodide, tetra-n-hexylphosphoniumbromide, tetra-n-octylphosphoniumbromide, methyltriphenylphosphoniumbromide, methyltriphenylphosphoniumiodide, ethyltriphenylphosphoniumbromide, ethyltriphenylphosphoniumiodide, n-butyltriphenylphosphoniumbromide, n-butyltriphenylphosphoniumchloride, n-hexyltriphenylphosphoniumbromide, n-octyltriphenylphosphoniumbromide, tetraphenylphosphoniumbromide, tetrakishydroxymethylphosphoniumchloride, tetrakishydroxymethylphosphoniumbromide, tetrakishydroxyethylphosphoniumchloride, tetrakishydroxybutylphosphoniumchloride, and the like. Tetra-n-butylphosphoniumbromide is preferable.

Specific examples of the tertiary sulfonium salts include trimethylsulfoniumbromide, triethylsulfoniumbromide, tri-n-butylsulfoniumchloride, tri-n-butylsulfoniumbromide, tri-n-butylsulfoniumiodide, tri-n-butylsulfoniumtetrafluoroborate, tri-n-hexylsulfoniumbromide, tri-n-octylsulfoniumbromide, triphenylsulfoniumchloride, triphenylsulfoniumbromide, triphenylsulfoniumiodide, and the like.

Specific examples of the secondary iodonium salts include diphenyliodoniumchloride, diphenyliodoniumbromide, diphenyliodoniumiodide, and the like.

Specific examples of the boron trihalides and complexes thereof include boron trifluoride, boron trifluoride-ethylether complex, boron trifluoride-n-butylether complex, boron trifluoride-phenol complex, boron trifluoride-ethylamine complex, boron trifluoride-piperidine complex, boron trifluoride-acetic acid complex, boron trifluoride-triethanolamine complex, boron trifluoride-ammonia complex, and the like. Among these, boron trifluoride-diethylether complex is preferable.

Preferable examples of the organic acids and esters thereof include sulfonic acid, carboxylic acid, and esters thereof. Specific examples thereof include methanesulfonic acid, trifluoromethanesulfonic acid, benzenesulfonic acid, p-toluenesulfonic acid, 10-chamfer sulfonic acid, and methyls and ethylesters thereof. Among these, preferable compounds are trifluoromethanesulfonic acid, methyl trifluoromethanesulfonate, and ethyl trifluoromethanesulfonate.

Specific examples of the metal halides include zinc chloride, iron chloride, aluminum chloride, tin chloride, titanium chloride, methylaluminum dichloride, ethylaluminum dichloride, dimethylaluminum chloride, and diethylaluminum chloride.

Specific examples of the peroxides include ketoneperoxides such as methylethylketoneperoxide, cyclohexanoneperoxide, acetylacetoneperoxide, and the like; peroxyketals such as 1,1-di(tert-hexylperoxy)-3,3,5-trimethylcyclohexane, 1,1-di(tert-hexylperoxy)cyclohexane, 1,1-di(tert-butylperoxy)-2-methylcyclohexane, 1,1-di(tert-butylperoxy)cyclohexane, 2,2-di(tert-butylperoxy)butane, n-butyl-4,4-di(tert-butylperoxy)valerate, 2,2-di[4,4-di(tert-butylperoxy)cyclohexyl]propane, and the like; hydroperoxides such as p-menthahydroperoxide, diisopropylbenzenehydroperoxide, 1,1,3,3-tetramethylbutylhydroperoxide, cumenehydroperoxide, tert-butylhydroperoxide, and the like; dialkylperoxides such as di(2-tert-butylperoxyisopropyl)benzene, dicumylperoxide, 2,5-dimethyl-2,5-di(tert-butylperoxy)hexane, tert-cumylperoxide, di-tert-hexylperoxide, di-tert-butylperoxide, 2,5-dimethyl-2,5-di(tert-butylperoxy)-3-hexyne, and the like; diacylperoxides such as diisobutylylperoxide, di(3,5,5-trimethylhexanoyl)peroxide, dilauroylperoxide, di(3-methylbenzoyl)peroxide, benzoyl(3-methylbenzoyl)peroxide, dibenzoylperoxide, di(4-methylbenzoyl)peroxide, and the like; peroxydicarbonates such as di-n-propylperoxydicarbonate, diisopropylperoxydicarbonate, di(4-tert-butylcyclohexyl)peroxydicarbonate, di(2-ethylhexyl)peroxydicarbonate, di-sec-butylperoxydicarbonate, diallylperoxydicarbonate, di-n-diisopropylperoxydicarbonate, dimyristylperoxydicarbonate, and the like; peroxyesters such as cumylperoxyneodecanoate, 1,1,3,3-tetramethylbutylperoxyneodecanoate, tert-hexylperoxyneodecanoate, tert-butylperoxyneodecanoate, tert-butylperoxyneoheptanoate, tert-hexylperoxypivalate, tert-butylperoxypivalate, 1,1,3,3-tetramethylbutylperoxy-2-ethylhexanoate, 2,5-dimethyl-2,5-di(2-ethylhexanoylperoxy)hexane, tert-hexylperoxy-2-ethylhexanoate, tert-butylperoxy-2-ethylhexanoate, tert-hexylperoxyisopropylmonocarbonate, tert-butylperoxymaleic acid, tert-butylperoxy-3,5,5-trimethylhexanoate, tert-butylperoxylaurate, tert-butylperoxyisopropylmonocarbonate, tert-butylperoxy-2-ethylhexylmonocarbonate, tert-hexylperoxybenzoate, 2,5-dimethyl-2,5-di(benzoylperoxy)hexane, tert-butylperoxyacetate, tert-butylperoxy-3-methylbenzoate, tert-butylperoxybenzoate, tert-butylperoxyneobenzoate, cumylperoxyneohexanoate, tert-hexylperoxyneohexanoate, tert-butylperoxyneohexanoate, and the like; tert-butylperoxyallylmonocarbonate; 3,3',4,4'-tetra(tert-butylperoxycarbonyl)benzophenone; and the like. Preferable examples are di(3,5,5-trimethylhexanoyl)peroxide, dilauroylperoxide, benzoylperoxide, tert-butylperoxyneodecanoate, tert-hexylperoxypivalate, tert-butylperoxypivalate, 2,5-dimethyl-2,5-di(2-ethylhexanoylperoxy)hexane, 1,1,3,3-tetramethylbutylperoxy-2-ethylhexanoate, tert-hexylperoxy-2- ethylhexanoate, and tert-butylperoxy-2-ethylhexanoate. More preferable examples are tert-butylperoxyneodecanoate, 1,1,3,3-tetramethylbutylperoxy-2-ethylhexanoate, and tert-butylperoxy-2-ethylhexanoate.

Specific examples of the azo compounds include 2,2'-azobis(4-methoxy-2,4-dimethylvaleronitrile), 2,2'-azobis(2-cyclopropylcyclonitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane), 2,2'-azobis(2,4,4-trimethylpentane), and the like.

Specific examples are shown above, but the curing catalyst is not limited to these, and the compounds may be used independently or as a mixture of two or more. It is preferable to combine at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides; with at least one compound selected from peroxides and azo compounds. It is more preferable to combine at least one compound selected from the group consisting of amines having a heterocyclic ring, phosphines, quaternary ammonium salts, quaternary phosphonium salts, boron trihalides and complexes thereof, organic acids and esters thereof, and metal halides; with at least one compound selected from peroxides and azo compounds. It is still more preferable to combine at least one compound selected from the group consisting of amines having a heterocyclic ring, quaternary ammonium salts, quaternary phosphonium salts, boron trihalides and complexes thereof, organic acids and esters thereof, and metal halides; with at least one compound selected from peroxides. It is most preferable to combine at least one compound selected from the group consisting of amines having a heterocyclic ring, quaternary phosphonium salts, boron trihalides and complexes thereof, organic acids and esters thereof, and metal halides; with at least one compound selected from peroxides.

The amount of the catalyst is preferably 0.002 to 6% by weight, and more preferably 0.01 to 4% by weight, with respect to the composition for an optical member according to the present invention. In the case where a preferable combination is used, the amount of at least one compound selected from amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides is preferably 0.001 to 3% by weight with respect to the composition for an optical member according to the present invention. The amount of at least one compound selected from peroxides and azo compounds is preferably 0.001 to 3% by weight with respect to the composition for an optical member according to the present invention. The amount of at least one compound selected from amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides is more preferably 0.005 to 2% by weight with respect to the composition for an optical member according to the present invention. The amount of at least one compound selected from peroxides and azo compounds is more preferably 0.005 to 2% by weight with respect to the composition for an optical member according to the present invention.

In the case where an optical member is obtained by polymerizing and curing a composition for an optical member according to the present invention, it is. needless to say, possible to incorporate a well-known antioxidant, ultraviolet absorber, bluing agent or the like to further improve the practicality of the member obtained.

Preferable examples of the ultraviolet absorber include salicylic acid-based compounds, benzophenone-based compounds, benzotriazole-based compounds, cyanoacrylate-based compounds, and the like. Specific examples of the salicylic acid-based compounds include phenylsalicylate, p-tert-butylphenylsalicylate, and p-octylphenylsalicylate. Specific examples of the benzophenone-based compounds include 2,4-dihydroxybenzophenone, 2-hydroxy-4-methoxybenzophenone, 2-hydroxy-4-octoxybenzophenone, 2-hydroxy-4-dodecyloxybenzophenone, 2-hydroxy-4-benzoyloxybenzophenone, 2,2,4,4-tetrahydroxybenzophenone, 2,2-dihydroxy-4-methoxybenzophenone, 2,2-dihydroxy-4, 4-dimethoxybenzophenone, 2-hydroxy-4-methoxy-5-sulfobenzophenone, bis(2-methoxy-4-hydroxy-5-benzoylphenyl)methane, and 1,4-bis(4-benzoyl-3-hydroxyphenoxy) butane. Specific examples of the benzotriazole-based compounds include 2-(2-hydroxy-5-methylphenyl)-2H-benzotriazole, 5-chloro-2-(3,5-di-tert-butyl-2-hydroxyphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(3,5-di-tert-butyl-2-hydroxyphenyl)-2H-benzotriazole, 2-(2-hydroxy-4-octyloxyphenyl)-2H-benzotriazole, 2-(2-hydroxy-5-tert-octylphenyl)-2H-benzotriazole, 2-(2-hydroxy-5-tert-butylphenyl)-2H-benzotriazole, 2-(3,5-di-tert-amyl-2-hydroxyphenyl)-2H-benzotriazole, 2-(2-hydroxy-5-methacryloxyphenyl)-2H-benzotriazole, 2-[2-hydroxy-3-(3, 4,5,6-tetrahydrophthalimidemethyl)-5-methylphenyl]-2H-benzotriazole, and 2,2-methylenebis [4-(1,1,3,3-tetramethylbutyl)-6-(2H-benzotriazole-2-yl)phenol].

Specific examples of the cyanoacrylate-based compounds include 2-ethylhexyl-2-cyano-3,3-diphenylacrylate, ethyl-2-cyano-3,3-diphenylacrylate, and the like. Among these, preferable compounds are the benzophenone-based compounds and the benzotriazole-based compounds. The most preferable compounds are the benzotriazole-based compounds. These compounds may be used independently or as a mixture of two or more.

Preferable examples of the bluing agent include anthraquinone-based compounds. The amount of each of the antioxidant, ultraviolet absorber and bluing agent is usually 0.000001 to 5% by weight with respect to the composition for an optical member.

In the case where the composition for an optical member according to the present invention is likely to be peeled off from the mold during the polymerization, it is possible to use or incorporate a known external or internal adhesiveness improving agent to improve the adhesiveness of the cured substance to be obtained and the mold. Examples of the adhesiveness improving agent include known silane coupling agents, titanate compounds, and the like. These substances may be used independently or as a mixture thereof. The amount is usually 0.0001 to 5% by weight with respect to the composition for an optical member. By contrast, in the case where the composition for an optical member according to the present invention is unlikely to be removed from the mold after the polymerization, it is possible to use or incorporate a known external or internal mold release agent to improve the releasability of the cured substance to be obtained from the mold. Examples of the mold release agent include fluorine-based nonion surfactants, silicon-based nonion surfactants, phosphoric acid esters, acidic phosphoric acid esters, oxyalkylene-type acidic phosphoric acid esters, alkali metal salts of acidic phosphoric acid esters, alkali metal salts of oxyalkylene-type acidic phosphoric acid esters, metal salts of higher fatty acids, higher fatty acid esters, paraffin, wax, higher aliphatic amides, higher aliphatic alcohols, polysiloxanes, aliphatic amineethyleneoxide adducts, and the like. These mold release agents may be used independently or as a mixture of two or more. The amount is generally 0.0001 to 5% by weight with respect to the composition for an optical member.

There is no specific limitation on the method for producing an optical member by polymerizing and curing the composition for an optical member according to the present invention. The following method is preferably usable. The above-described components of the composition, and an additive such as an antioxidant, an ultraviolet absorber, a polymerization catalyst, a radical polymerization catalyst, an adhesiveness improving agent, a mold release agent or the like may be all stirred together and mixed in the same vessel, or these materials may be added and mixed step by step. Alternatively, parts of the materials may be mixed separately, and then all the materials may be re-mixed in the same vessel. The materials and sub materials may be mixed in any order. Basically, there is no limitation on the set temperature, time and the like for mixing as long as the materials are fully mixed.

According to the present invention, the composition for an optical member may be deaerated beforehand, which may achieve a high transparency of the optical member. The deaeration may be performed before, during or after the mixing of a compound reactive with a part or the entirety of the components of the composition, the polymerization catalyst and the additive(s) under a reduced pressure. Preferably, the deaeration is performed during or after the mixing under a reduced pressure. The deaeration conditions are a reduced pressure of 0.001 to 50 torr; 1 minute to 24 hours; and 0° C. to 100° C. The pressure reduction degree is preferably 0.005 to 25 torr, and more preferably 0.01 to 10 torr. The pressure reduction degree may be varied in this range. The deaeration time is preferably 5 minutes to 18 hours, and more preferably 10 minutes to 12 hours. The deaeration temperature is preferably 5° C. to 80° C., and more preferably 10° C. to 60° C. The temperature may be varied in this range. During the deaeration, updating the interfaces between the components in the composition for an optical member by stirring, introduction of a gas, vibration by ultrasonic waves, or the like is preferable to improve the deaeration effect. The components which are removed by the deaeration are mainly dissolved gas such as hydrogen sulfide, low boiling point substances such as low molecular weight thiols, and the like. Passing the resin composition and/or each pre-mixing material through a filter having a pore diameter of about 0.05 to 10 μm to filter out solid contents or the like for refinement is also preferable to further improve the quality of the optical member according to the present invention.

The optical member can be produced by injecting such a composition for an optical member into a glass or metal mold to advance the polymerization and curing reaction by heating or radiation of active energy rays such as ultraviolet, and then removing the composition from the mold. Preferably, the polymerization and curing reaction is conducted by heating. In this case, the curing time is 0.1 to 200 hours, and generally 1 to 100 hours. The curing temperature is −10 to 160° C., and generally −10 to 140° C. The polymerization is performed by a method of keeping the composition at a predetermined temperature for a predetermined time, a method of raising the temperature at 0.1° C. to 100° C./hour and lowering the temperature at 0.1° C. to 100° C./hour, or a combination thereof. Annealing the cured substance at a temperature of 50 to 150° C. for about 10 minutes to 5 hours after the polymerization is preferable to remove the distortion of the optical member according to the present invention. Optionally, surface treatment such as dyeing, hard-coating, anti-impact coating, reflection prevention, provision of an antifogging property or the like may be performed.

A polymer obtained in this manner is three-dimensionally cross-linked, and so is a resin which is made insoluble and unmeltable.

EXAMPLES

The present invention will be specifically described by way of examples, but the present invention is not limited to these examples. The obtained lenses were evaluated by the following methods.

Optical properties: The refractive index and the Abbe number at the d line were measured at 25° C. using Abbe Refractometer NAR-4T made by Atago Inc.

Amount of remaining β-epithiopropyl groups: An IR measurement was conducted using FT-IR Spectrometer 410DS made by JASCO Inc., and the amount of remaining β-epithiopropyl groups was measured based on the absorption peak (620 cm$^{-1}$) area size of the β-epithiopropyl groups. A sample having a remaining amount of less than 5% was evaluated as ○ (good), and a sample having a remaining amount of 5% or more was evaluated x (poor).

Light resistance: YI was measured before and after a flat plate having a thickness of 2.5 mm was irradiated with carbon arc light for 60 hours using Sunshine Weather Meter WEL-SUN-HC made by Suga Test Instruments Inc., and the difference between the YI values before and after the irradiation was found. A sample exhibiting a difference of less than 1.0 was evaluated as ○ (good), and a sample exhibiting a difference of 1.0 or more was evaluated as x (poor).

Transparency: It was observed whether a lens having a thickness of 10 mm was cloudy or not in a darkroom with Slide Projector AF-2500 made by Cabin Industry Inc. A sample which was not observed to be cloudy was evaluated as ○ (good), a sample which was observed to be slightly cloudy was evaluated as Δ (slightly poor), and a sample which was observed to be cloudy was evaluated as x (poor).

Heat resistance: A pin having a diameter of 1 mm was put on a sample, and a load of 10 g was applied thereto. A TMA measurement was conducted by raising the temperature from 30° C., and the softening point was measured using Thermal Stress Strain Measurement Instrument TMA/SS6000 made by Seiko Instrument Inc. A sample exhibiting a softening point of more than 120° C. was evaluated as A (very good), a sample exhibiting a softening point of 100 to 120° C. was evaluated as B (good), a sample exhibiting a softening point of 80 to 100° C. was evaluated as C (slightly poor), and a sample exhibiting a softening point of less than 80° C. was evaluated as D (poor).

Specific gravity: The specific gravity was measured at 25° C. using Electronic Densimeter ED-120T made by Alfa Mirage Inc.

Strength: A hole having a diameter of 2 mm was made in a flat plate having a thickness of 2.5 mm at a position 3 mm away from an edge thereof, and a pin was inserted into the hole. The pin was pulled using Autograph AG-5000B by Shimadzu Inc., and the tensile fracture strength was measured. A sample exhibiting a tensile fracture strength of 1000 gf or more was evaluated as A (very good), a sample exhibiting a tensile fracture strength of 600 gf or more and less than 1000 gf was evaluated as B (good), a sample exhibiting a tensile fracture strength of 300 gf or more and less than 600 gf was evaluated as C (slightly poor), and a sample exhibiting a tensile fracture strength of less than 300 gf was evaluated as D (poor).

Example 1

To 100 parts by weight of thioglycidylmethacrylate (the compound of formula (1) in which X is O and Y is a methacryloyl group; hereinafter, referred to simply as "TGMA"), 0.2 parts by weight of tetrabutylphosphoniumbromide and 0.5 parts by weight of tert-butylperoxyneodecanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 110° C. over 22 hours in an oven. Then, the resultant substance was removed from the mold and heated at 110° C. for 1 hour to be annealed. The obtained lens was transparent and had a good external appearance. The optical properties and the like were measured. The results are shown in Table 1.

Examples 2 through 9

Lenses were obtained by polymerization and curing performed in substantially the same manner as in Example 1 using the compositions and the catalysts shown in Table 1. The obtained lenses were transparent and had a good external appearance. The optical properties and the like were measured. The results are shown in Table 1.

TABLE 1

| Example | Composition (parts by weight) | Catalyst (parts by weight) | Refractive index | Abbe number |
|---|---|---|---|---|
| 1 | TGMA = 100 | TBPB/PBND = 0.2/0.5 | 1.58 | 45 |
| 2 | TGMA = 100 | MI/POO = 1.0/1.0 | 1.58 | 45 |
| 3 | TGMA = 100 | TBP/PBO = 1.0/3.0 | 1.58 | 45 |
| 4 | TGMA = 100 | BE/POO = 0.1/0.1 | 1.58 | 45 |
| 5 | ATGE = 100 | BE/PBO = 0.1/0.5 | 1.59 | 44 |
| 6 | ATGE = 100 | EBAC/AIBN = 0.2/0.5 | 1.59 | 44 |
| 7 | TSMA = 100 | MI/POO = 1.0/1.0 | 1.63 | 42 |
| 8 | ATSE = 100 | MI/POO = 1.0/1.0 | 1.64 | 42 |
| 9 | TGMA = 100 | BE = 0.1 | 1.58 | 45 |

Abbreviations for the compounds in Table 1
TGMA: Thioglycidylmethacrylate; the compound of formula (1) in which X is O and Y is a methacryloyl group
ATGE: Allylthioglycidylether; the compound of formula (1) in which X is O and Y is an allyl group
TSMA: Thioglycidylthiomethacrylate; the compound of formula (1) in which X is S and Y is a methacryloyl group
ATSE: Allylthioglycidylthioether; the compound of formula (1) in which X is S and Y is an allyl group
Abbreviations for the catalysts in Table 1
MI: N-methylimidazole
TBPB: Tetrabutylphosphoniumbromide
EBAC: Triethylbenzylammoniumchloride
TBP: Tributylphosphine
BE: Boron trifluoride-ethylether complex
PBND: Tert-butylperoxyneodecanoate
POO: 1,1,3,3-tetramethylbutylperoxy-2-ethylhexanoate
PBO Tert-butylperoxy-2-ethylhexanoate
AIBN: Azobisisobutylonitrile Comparative Example 1

75 parts by weight of 2,2-bis(3,5-dibromo-4-(2-methacryloyloxy)phenyl)propane, 25 parts by weight of styrene, and 1.0 parts by weight of tert-butylperoxyneodecanoate were added together, and polymerized and cured in substantially the same manner as in Example 1 to obtain a lens. The obtained lens was transparent and had a good external appearance. The optical properties and the like were measured. The results are shown in Table 2.

Comparative Example 2

56 parts by weight of pentaerythritoltetrakis(3-mercaptopropionate), 44 parts by weight of m-xylylenediisocyanate, 0.05 parts by weight of dibutyltindichloride as a catalyst, and 0.01 parts by weight of ZELEC UN as an internal mold release agent were added together, and polymerized and cured in substantially the same manner as in Example 1 to obtain a lens. The obtained lens was transparent and had a good external appearance. The optical properties and the like were measured. The results are shown in Table 2.

Comparative Example 3

To 100 parts by weight of glycidylmethacrylate, 0.2 parts by weight of tetrabutylphosphoniumbromide and 0.5 parts by weight of tert-butylperoxyneodecanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 110° C. over 22 hours in an oven. Only a substance too soft to be used as a lens was obtained, and the optical properties could not be measured.

Comparative Example 4

The procedure of Comparative Example 3 was repeated except that allylglycidylether was used instead of glycidylmethacrylate. Only a substance too soft to be used as a lens was obtained, and the optical properties could not be measured.

TABLE 2

| Comparative Example | Composition (parts by weight) | Catalyst (parts by weight) | Refractive index | Abbe number |
|---|---|---|---|---|
| 1 | BPAMA/ST = 75/25 | PBND = 1.0 | 1.60 | 32 |
| 2 | PETP/MXDI = 56/44 | BTC = 0.05 | 1.60 | 36 |
| 3 | GMA = 100 | TBPB/PBND = 0.2/0.5 | Could not be measured | |
| 4 | AGE = 100 | TBPB/PBND = 0.2/0.5 | Could not be measured | |

Abbreviations for the compounds in Table 2
BPAMA: 2,2-bis(3,5-dibromo-4-(2-methacryloyloxy)phenyl)propane (following structural formula)

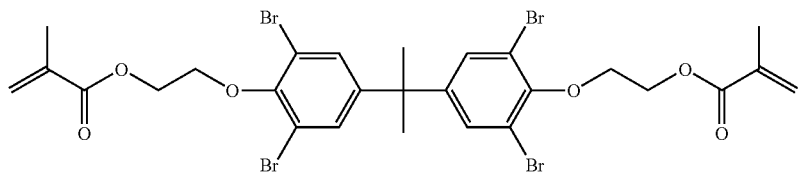 [SMILES: C=C(C)C(=O)OCCOc1c(Br)cc(C(C)(C)c2cc(Br)c(OCCOC(=O)C(=C)C)c(Br)c2)cc1Br]

ST: Styrene (following structural formula)

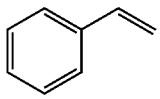

PETP: Pentaerythritoltetrakis(3-mercaptopropionate) (following structural formula)

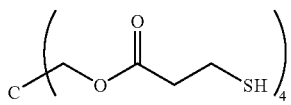

MXDI: m-xylylenediisocyanate (following structural formula)

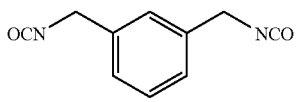

GMA: Glycidylmethacrylate (following structural formula)

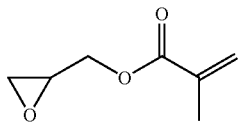

AGE: Allylglycidylether (following structural formula)

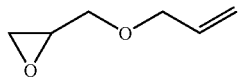

Abbreviations for the catalysts in Table 2
PBND: Tert-butylperoxyneodecanoate
BTC: Dibutyltindichloride
TBPB: Tetrabutylphosphoniumbromide Example 10

To 90 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule and 10 parts by weight of bis(β-epithiopropyl)sulfide as (b) a compound having one or more β-epithiopropyl groups in a molecule while having no polymerizable unsaturated bond group, 0.3 parts by weight of N-methyl-2-mercaptoimidazole and 1.0 parts by weight of 1,1,3,3-tetramethylbutylperoxy-2-ethylhexanoate as catalysts were added. These components were stirred at room temperature to obtain a uniform liquid. Next, the resultant liquid was deaerated at 10 ton for 10 minutes, then filtrated, injected into a mold for lens, and polymerized and cured by raising the temperature from 30° C. to 110° C. over 22 hours in an oven. Then, the resultant substance was removed from the mold and heated at 110° C. for 1 hour to be annealed. The obtained lens was transparent and had a good external appearance. The optical properties and the like were measured. The results are shown in Table 3.

Examples 11 through 26

Lenses were obtained by polymerization and curing performed in substantially the same manner as in Example 10 using the compositions and the catalysts shown in Table 3. The obtained lenses were transparent and had a good external appearance. The optical properties and the like were measured. The results are shown in Table 3.

Example 27

To 90 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule, 6 parts by weight of bis(2-mercaptoethyl)sulfide as (d) a compound having one or more thiol groups in a molecule, and 4 parts by weight of sulfur as (c) an inorganic compound having a sulfur atom and/or a selenium atom, 0.5 parts by weight of N-methyl-2-mercaptoimidazole as a reserve reaction catalyst was added. These components were stirred at 60° C. While the consumption ratio of sulfur was checked by liquid chromatography using a GPC column, the reaction was continued until 50% of sulfur was reacted. Then, 0.1 parts by weight of tetrabutylphosphoniumbromide and 0.5 parts by weight of tert-butylperoxyneodecanoate as catalysts, and 0.05 parts by weight of dibutyltindichloride as a polymerization adjustor were added thereto, and these components were stirred to obtain a uniform liquid. Next, the resultant liquid was deaerated at 10 torr for 10 minutes, then filtrated, injected into a mold for lens, and polymerized and cured by raising the temperature from 30° C. to 110° C. over 22 hours in an oven. Then, the resultant substance was removed from the mold and heated at 110° C. for 1 hour to be annealed. The obtained lens was transparent and had a good external appearance. The optical properties and the like were measured. The results are shown in Table 3.

TABLE 3

| Example | Composition (parts by weight) | Catalyst (parts by weight) | Refractive index | Abbe number |
|---|---|---|---|---|
| 10 | TGMA/BES = 90/10 | MMI/POO = 0.3/1.0 | 1.59 | 43 |
| 11 | TGMA/BES = 90/10 | BE/POO = 0.1/0.1 | 1.59 | 43 |
| 12 | TGMA/BES = 80/20 | MMI/POO = 0.3/1.0 | 1.61 | 42 |
| 13 | TGMA/BES = 50/50 | MMI/TBPB/POO = 0.1/0.2/0.5 | 1.64 | 38 |
| 14 | TGMA/BES = 35/65 | MMI/TBPB/POO = 0.1/0.2/0.5 | 1.67 | 37 |
| 15 | TGMA/BES = 10/90 | TBPB/POO = 0.2/0.1 | 1.70 | 36 |
| 16 | ATGE/BES = 80/20 | MMI/POO = 0.3/1.0 | 1.61 | 42 |
| 17 | ATGE/BES = 20/80 | TBPB/POO = 0.2/0.1 | 1.69 | 37 |
| 18 | EPTMS/BEPD = 70/30 | MMI/POO = 0.3/1.0 | 1.63 | 41 |
| 19 | EPTMS/BEPD = 30/70 | TBPB/POO = 0.2/0.1 | 1.68 | 37 |
| 20 | TGMA/BES/BMES = 85/10/5 | MMI/POO = 0.3/1.0 | 1.60 | 43 |
| 21 | TGMA/BES/BMES = 10/85/5 | TBPB/POO = 0.2/0.1 | 1.70 | 36 |
| 22 | ATGE/BEPD/PETP = 85/10/5 | MMI/POO = 0.3/1.0 | 1.60 | 44 |
| 23 | ATGE/BEPD/PETP = 10/85/5 | TBPB/POO = 0.2/0.1 | 1.65 | 41 |
| 24 | EPTMS/BES/BMES = 65/25/10 | MMI/POO = 0.3/1.0 | 1.62 | 42 |
| 25 | TGMA/S = 98/2 | TBPB/PBND = 0.1/0.5 | 1.59 | 44 |
| 26 | ATGE/S = 98/2 | TBPB/PBND = 0.1/0.5 | 1.59 | 44 |
| 27 | TGMA/S/BMES = 90/6/4 | MMI/TBPB/PBND = 0.5/0.1/0.5 | 1.60 | 44 |

Abbreviations for the compounds in Table 3

(a) compound

TGMA: Thioglycidylmethacrylate

ATGE: Allylthioglycidylether

EPTMS: 50/50 (weight ratio) mixture of 3-(β-epithiopropylthiomethyl)styrene and 4-(β-epithiopropylthiomethyl)styrene (following structural formulas)

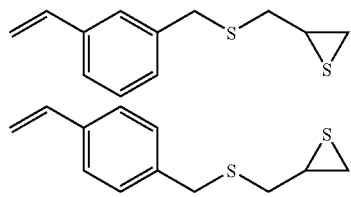

(b) compound

BES: Bis(β-epithiopropyl)sulfide (following structural formula)

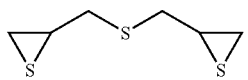

BEPD: 2,5-bis(β-epithiopropylthiomethyl)-1,4-dithiane (following structural formula)

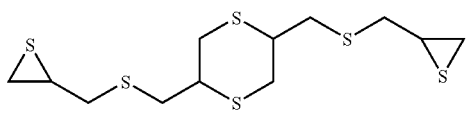 [SMILES: C(SCC1CSC(CSCC2CS2)CS1)C1CS1]

(c) compound

S: Sulfur (d) compound

BMES: Bis(2-mercaptoethyl)sulfide (following structural formula)

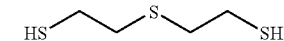

PETP: Pentaerythritoltetrakis(3-mercaptopropionate)

Abbreviations for the catalysts in Table 3

MMI: N-methyl-2-mercaptoimidazole

TBPB: Tetrabutylphosphoniumbromide

POO: 1,1,3,3-tetramethylbutylperoxy-2-ethylhexanoate

PBND: Tert-butylperoxyneodecanoate

BE: Boron trifluoride-ethylether complex

Comparative Examples 5 and 6

The procedure of Comparative Example 2 was repeated except that the composition ratio was changed to those shown in Table 4. Because the composition ratio was changed, polymerization and curing did not occur.

Comparative Example 7

To 48 parts by weight of 4-mercaptomethyl-1,8-dimercapto-3,6-dithiaoctane and parts by weight of m-xylylenediisocyanate, 0.05 parts by weight of dibutyltindichloride as a catalyst and 0.01 parts by weight of ZELEC UN as an internal mold release agent were added. These components were polymerized and cured in substantially the same manner as in Example 1 to obtain a lens. The obtained lens was transparent and had a good external appearance. The optical properties and the like were measured. The results are shown in Table 4.

Comparative Examples 8 and 9

The procedure of Comparative Example 7 was repeated except that the composition ratio was changed to those shown in Table 4. Because the composition ratio was changed, polymerization and curing did not occur.

TABLE 4

| Comparative Example | Composition (parts by weight) | Catalyst (parts by weight) | Refractive index | Abbe number |
|---|---|---|---|---|
| 2 | PETP/MXDI = 56/44 | BTC = 0.05 | 1.60 | 36 |
| 5 | PETP/MXDI = 90/10 | BTC = 0.05 | Was not cured | |
| 6 | PETP/MXDI = 10/90 | BTC = 0.05 | Was not cured | |
| 7 | MDD/MXDI = 48/52 | BTC = 0.05 | 1.66 | 32 |
| 8 | MDD/MXDI = 90/10 | BTC = 0.05 | Was not cured | |
| 9 | MDD/MXDI = 10/90 | BTC = 0.05 | Was not cured | |

Abbreviations for the compounds in Table 4
PETP: Pentaerythritoltetrakis(3-mercaptopropionate)
MXDI: m-xylylenediisocyanate
MDD: 4-mercaptomethyl-1,8-dimercapto-3,6-dithiaoctane (following structural formula)

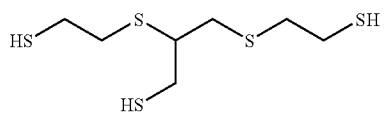

Abbreviations for the catalysts in Table 4
BTC: Dibutyltindichloride

FIG. 1 shows the relationship between the refractive index and the Abbe number of the optical members obtained in Examples 1 through 27 and Comparative Examples 1, 2 and 7. Samples which are higher in both the refractive index and the Abbe number, namely, samples shown closer to the upper right corner of FIG. 1 have better optical properties.

Example 28

To 95 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule and 5 parts by weight of bis(2-mercaptoethyl)sulfide as (d) a compound having one or more thiol groups in a molecule, 0.2 parts by weight of tetrabutylphosphoniumbromide and 0.5 parts by weight of tert-butylperoxyneodecanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 110° C. over 22 hours in an oven. Then, the resultant substance was removed from the mold and heated at 110° C. for 1 hour to be annealed. The obtained lens was transparent and had a good external appearance. The optical properties and the like were measured. The results are shown in Table 5.

Examples 29 through 36

Lenses were obtained by polymerization and curing performed in substantially the same manner as in Example 28 using the compositions and the catalysts shown in Table 5. The obtained lenses were transparent and had a good external appearance. The optical properties and the like were measured. The results are shown in Table 5.

TABLE 5

| Ex. | Composition (parts by weight) | Catalyst (parts by weight) | Refractive index | Abbe number | Transparency |
|---|---|---|---|---|---|
| 28 | TGMA/BMES = 95/5 | TBPB/PBND = 0.2/0.5 | 1.59 | 44 | ○ |
| 29 | TGMA/BMES = 95/5 | MI/POO = 1.0/1.0 | 1.59 | 44 | ○ |
| 30 | TGMA/BMES = 95/5 | TBP/PBO = 1.0/3.0 | 1.59 | 44 | ○ |
| 31 | ATGE/BMES = 95/5 | BE/PBO = 0.1/0.5 | 1.60 | 43 | ○ |
| 32 | TGMA/BMES = 95/5 | EBAC/AIBN = 0.2/0.5 | 1.59 | 44 | ○ |
| 33 | TGMA/BMES = 85/15 | MI/POO = 1.0/1.0 | 1.60 | 43 | ○ |
| 34 | ATGE/PETP = 90/10 | MI/POO = 1.0/1.0 | 1.58 | 45 | ○ |
| 35 | EPTMS/PETP = 90/10 | MI/POO = 1.0/1.0 | 1.61 | 43 | ○ |
| 36 | TGMA/BMES = 80/20 | BE/POO = 0.1/3.0 | 1.60 | 43 | ○ |

Abbreviations for the compounds in Table 5
(a) compound having one or more of any group selected from the group consisting of an acryloyl group, a methacryloyl group, an allyl group and a vinyl group and one or more β-epithiopropyl groups in a molecule
TGMA: Thioglycidylmethacrylate
ATGE: Allylthioglycidylether
EPTMS: 50/50 (weight ratio) mixture of 3-(β-epithiopropylthiomethyl)styrene and 4-(β-epithiopropylthiomethyl)styrene
(d) compound having one or more thiol groups in a molecule
BMES: Bis(2-mercaptoethyl)sulfide
PETP: Pentaerythritoltetrakis(3-mercaptopropionate)
Abbreviations for the catalysts in Table 5
MI: N-methylimidazole
TBPB: Tetrabutylphosphoniumbromide
EBAC: Triethylbenzylammoniumchloride
TBP: Tributylphosphine
BE: Boron trifluoride-ethyletherr complex
PBND: Tert-butylperoxyneodecanoate
POO: 1,1,3,3-tetramethylbutylperoxy-2-ethylhexanoate
PBO: Tert-butylperoxy-2-ethylhexanoate
AIBN: Azobisisobutylonitrile

Comparative Example 10

To 50 parts by weight of 2,2-bis(3,5-dibromo-4-(2-methacryloyloxy)phenyl)propane and 50 parts by weight of styrene, 1.0 parts by weight of tert-butylperoxyneodecanoate was added. These components were polymerized and cured in substantially the same manner as in Example 28 to obtain a lens. The results are shown in Table 6.

Comparative Example 11

Substantially the same procedure as in Example 28 was performed using the composition and the catalyst shown in Table 6. The results are shown in Table 6.

TABLE 6

| Comparative Example | Composition (parts by weight) | Catalyst (parts by weight) | Refractive index | Abbe number | Transparency |
|---|---|---|---|---|---|
| 1 | BPAMA/ST = 75/25 | PBND = 1.0 | 1.60 | 32 | Δ |
| 10 | BPAMA/ST = 50/50 | PBND = 1.0 | 1.60 | 32 | X |
| 11 | BPAMA/ST = 25/75 | PBND = 1.0 | 1.60 | 32 | X |

Abbreviations for the compounds in Table 6
BPAMA: 2,2-bis(3,5-dibromo-4-(2-methacryloyloxy)phenyl)propane
ST: Styrene
Abbreviations for the catalysts in Table 6
PBND: Tert-butylperoxyneodecanoate Example 37

To 90 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule and 10 parts by weight of styrene as (f) a compound having one or more of at least one group selected from the group consisting of a vinyl group, an acryloyl group, a methacryloyl group and an allyl group in a molecule, 1 part by weight of methylimidazole and 1 part by weight of 1,1,3,3-tetramethylbutylperoxy-2-ethylhexanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 120° C. over 22 hours in an oven. Then, the resultant substance was removed from the mold and heated at 110° C. for 1 hour to be annealed. The obtained lens was transparent and had a good external appearance. The properties and the like were measured. The results are shown in Table 7.

Examples 38 through 63

Lenses were obtained by polymerization and curing performed in substantially the same manner as in Example 37 using the compositions and the catalysts shown in Table 7. The obtained lenses were transparent and had a good external appearance. The properties and the like were measured. The results are shown in Table 7.

TABLE 7

| Example | Composition (parts by weight) | Catalyst (parts by weight) | Refractive index | Heat resistance | Specific gravity | Strength |
|---|---|---|---|---|---|---|
| 37 | TGMA/ST = 90/10 | MI/POO = 1/1 | 1.59 | A | 1.15 | B |
| 38 | TGMA/ST = 90/10 | TBPB/PBND = 0.2/0.5 | 1.59 | A | 1.15 | B |
| 39 | TGMA/ST = 80/20 | MI/POO = 1/1 | 1.59 | A | 1.14 | B |
| 40 | TGMA/ST = 50/50 | MI/POO = 1/1 | 1.59 | A | 1.11 | B |
| 41 | TGMA/ST = 30/70 | MI/POO = 1/1 | 1.59 | A | 1.09 | B |
| 42 | TGMA/ST = 20/80 | BE/POO = 0.1/0.1 | 1.59 | A | 1.09 | B |
| 43 | TGMA/ST = 20/80 | BE/POO = 0.2/0.5 | 1.59 | A | 1.09 | B |
| 44 | TGMA/ST = 20/80 | MI/POO = 1/1 | 1.59 | A | 1.08 | A |
| 45 | TGMA/ST = 20/80 | TBPB/PBND = 0.2/0.5 | 1.59 | A | 1.08 | A |
| 46 | TGMA/ST = 20/80 | TFM/POO = 0.1/0.1 | 1.59 | A | 1.08 | A |
| 47 | TGMA/ST = 20/80 | ZC/POO = 0.2/0.1 | 1.59 | A | 1.08 | A |
| 48 | TGMA/ST = 10/90 | TBPB/PBO = 1/1 | 1.59 | A | 1.07 | A |
| 49 | TGMA/ST = 5/95 | TBPB/PBO = 1/1 | 1.59 | A | 1.06 | B |
| 50 | ATGE/ST = 80/20 | MI/POO = 1/1 | 1.60 | A | 1.14 | B |
| 51 | ATGE/ST = 50/50 | TBPB/PBND = 0.2/0.5 | 1.60 | A | 1.13 | B |
| 52 | ATGE/ST = 20/80 | EBAC/AIBN = 0.2/0.5 | 1.60 | A | 1.08 | A |
| 53 | ATGE/DVB = 90/10 | TBPB/PBND = 0.2/0.5 | 1.60 | A | 1.15 | B |
| 54 | ATGE/DVB = 30/70 | BE/PBO = 0.1/0.5 | 1.60 | A | 1.09 | B |
| 55 | EPTMS/αMS = 80/20 | TBPB/PBND = 0.2/0.5 | 1.60 | A | 1.13 | B |
| 56 | EPTMS/αMS = 50/50 | TBP/PBO = 1.0/3.0 | 1.60 | A | 1.11 | B |
| 57 | TGMA/ST/PGE = 18/72/10 | TFM/POO = 0.5/0.2 | 1.59 | A | 1.10 | A |
| 58 | TGMA/ST/BPG = 18/72/10 | TFM/POO = 0.5/0.1 | 1.59 | A | 1.10 | A |
| 59 | TGMA/ST/BMES = 20/78/2 | BE/POO = 0.2/0.2 | 1.59 | A | 1.08 | A |
| 60 | TGMA/ST/BMES = 25/70/5 | MI/POO = 1/1 | 1.60 | B | 1.10 | A |
| 61 | TGMA/ST/BMES = 60/30/10 | MI/POO = 1/1 | 1.60 | A | 1.13 | B |
| 62 | ATGE/ST/BMES = 40/40/20 | TBPB/PBND = 0.2/0.5 | 1.61 | B | 1.14 | B |
| 63 | ATGE/DVB/XDT = 30/40/30 | TBPB/PBND = 0.2/0.5 | 1.62 | A | 1.15 | B |

Abbreviations for the compounds in Table 7
(a) compound
TGMA: Thioglycidylmethacrylate
ATGE: Allylthioglycidylether
EPTMS: 50/50 (weight ratio) mixture of 3-(β-epithiopropylthiomethyl)styrene and 4-(β-epithiopropylthiomethyl)styrene
(f) compound
ST: Styrene
DVB: Divinylbenzene (following structural formulas)

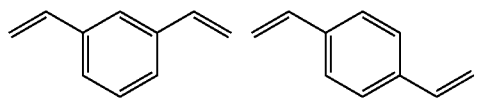

αMS: α-methylstyrene (following structural formula)

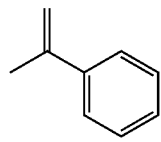

(d) compound
BMES: Bis(2-mercaptoethyl)sulfide
XDT: p-xylylenedithiol (following structural formula)

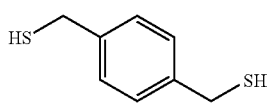

Other compounds
PGE: Phenylglycidylether (following structural formula)

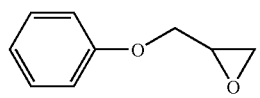

BPG: 2,2-bis(4-glycidyloxyphenyl)propane (following structural formula)

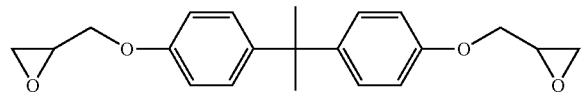

Abbreviations for the catalysts in Table 7
MI: N-methylimidazole
EBAC: Triethylbenzylammoniumchloride
TBP: Tributylphosphine
TBPB: Tetrabutylphosphoniumbromide
BE: Boron trifluoride-ethylether complex
TFM: Methyl trifluoromethanesulfonate
ZC: Zinc chloride
POO: 1,1,3,3-tetramethylbutylperoxy-2-ethylhexanoate
PBO Tert-butylperoxy-2-ethylhexanoate
AIBN: Azobisisobutylonitrile
PBND: Tert-butylperoxyneodecanoate Comparative Example 12

A lens was obtained by polymerization and curing performed in substantially the same manner as in Example 37 using the composition and the catalyst shown in Table 8. The obtained lens was transparent and had a good external appearance. The properties and the like were measured. The results are shown in Table 8.

Comparative Example 13

To 30 parts by weight of 1,9-nonanediolmethacrylate, 60 parts by weight of laurylmethacrylate and 10 parts by weight of α-methylstyrene, 1.2 parts by weight of tert-butylperoxyneodecanoate as a catalyst was added. These components were stirred at room temperature to obtain a uniform liquid. Next, the resultant liquid was deaerated at 10 torr for 10 minutes, then filtrated, injected into a mold for lens, and heated at 50° C. for 10 hours, at 60° C. for 8 hours, at 80° C. for 3 hours and at 100° C. for 2 hours in an oven to be polymerized and cured. Then, the resultant substance was removed from the mold and heated at 110° C. for 1 hour to be annealed. The obtained lens was transparent and had a good external appearance. The properties and the like were measured. The results are shown in Table 8.

TABLE 8

| Comparative Example | Composition (parts by weight) | Catalyst (parts by weight) | Refractive index | Heat resistance | Specific gravity | Strength |
|---|---|---|---|---|---|---|
| 12 | ST = 100 | POO = 1 | 1.59 | B | 1.06 | D |
| 1 | BPAMA/ST = 75/25 | PBND = 1 | 1.60 | C | 1.37 | D |
| 2 | PETP/MXDI = 56/44 | BTC = 0.05 | 1.60 | C | 1.34 | A |
| 13 | NDM/LMA/αMS = 30/60/10 | PBND = 1.2 | 1.50 | C | 1.01 | D |

Abbreviations for the compounds in Table 8

ST: Styrene

BPAMA: 2,2-bis(3,5-dibromo-4-(2-methacryloyloxy)phenyl)propane

PETP: Pentaerythritoltetrakis(3-mercaptopropionate)

MXDI: m-xylylenediisocyanate

NDM: 1,9-nonanediolmethacrylate (following structural formula)

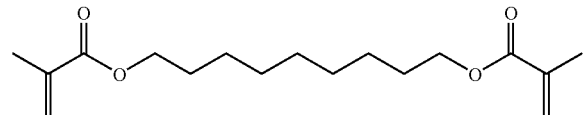 [SMILES: C=C(C)C(=O)OCCCCCCCCCOC(=O)C(=C)C]

LMA: Laurylmethacrylate (following structural formula)

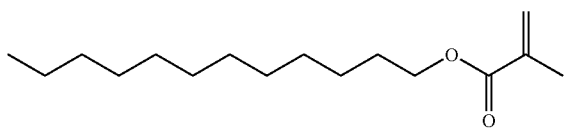 [SMILES: C=C(C)C(=O)OCCCCCCCCCCCC]

αMS: α-methylstyrene

Abbreviations for the catalysts in Table 8

POO: 1,1,3,3-tetramethylbutylperoxy-2-ethylhexanoate

PBND: Tert-butylperoxyneodecanoate

BTC: Dibutyltindichloride

Example 64

To 90 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule and 10 parts by weight of benzylmethacrylate as (f) a compound having one or more of at least one group selected from the group consisting of a vinyl group, an acryloyl group, a methacryloyl group and an allyl group in a molecule, 1.0 parts by weight of N-methylimidazole and 1.0 parts by weight of 1,1,3,3-tetramethylbutylperoxy-2-ethylhexanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 110° C. over 22 hours in an oven. Then, the resultant substance was removed from the mold and heated at 110° C. for 1 hour to be annealed. The obtained lens was transparent and had a good external appearance. The optical properties and the like were measured. The results are shown in Table 9.

Examples 65 through 76

Lenses were obtained by polymerization and curing performed in substantially the same manner as in Example 64 using the compositions and the catalysts shown in Table 9. The obtained lenses were transparent and had a good external appearance. The optical properties and the like were measured. The results are shown in Table 9.

TABLE 9

| Example | Composition (parts by weight) | Catalyst (parts by weight) | Refractive index | Abbe number |
| --- | --- | --- | --- | --- |
| 64 | TGMA/BMA = 90/10 | MI/POO = 1.0/1.0 | 1.58 | 43 |
| 65 | TGMA/BMA = 90/10 | BE/POO = 0.2/0.5 | 1.58 | 43 |
| 66 | ATGE/BMA = 90/10 | MI/POO = 1.0/1.0 | 1.59 | 43 |
| 67 | TGMA/MMA = 85/15 | TBPB/PBND = 0.2/0.5 | 1.57 | 48 |
| 68 | TGMA/MMA = 85/15 | TBP/PBO = 1.0/3.0 | 1.57 | 48 |
| 69 | TGMA/MMA = 85/15 | EBAC/AIBN = 0.2/0.5 | 1.57 | 48 |
| 70 | TGMA/GMA = 97/3 | TBPB/PBND = 0.2/0.5 | 1.58 | 45 |
| 71 | TGMA/ADC = 90/10 | MI/POO = 1.0/1.0 | 1.57 | 48 |
| 72 | EPTMS/DAP = 90/10 | TBPB/PBND = 0.2/0.5 | 1.60 | 43 |
| 73 | TGMA/BMA/BMES = 80/10/10 | MI/POO = 1.0/1.0 | 1.60 | 42 |
| 74 | TGMA/EB/BMES = 80/10/10 | MI/POO = 1.0/1.0 | 1.59 | 44 |
| 75 | TGMA/GMA/BMES = 80/3/17 | MI/POO = 1.0/1.0 | 1.60 | 43 |
| 76 | ATGE/BMA/PETP = 90/3/7 | MI/POO = 1.0/1.0 | 1.58 | 43 |

Abbreviations for the compounds in Table 9

(a) compound having one or more of any group selected from the group consisting of an acryloyl group, a methacryloyl group, an allyl group and a vinyl group and one or more β-epithiopropyl groups in a molecule TGMA: Thioglycidylmethacrylate ATGE: Allylthioglycidylether EPTMS: 50/50 (weight ratio) mixture of 3-(β-epithiopropylthiomethyl)styrene and 4-(β-epithiopropylthiomethyl)styrene (f) compound having one or more of at least one group selected from the group consisting of an acryloyl group, a methacryloyl group and an allyl group in a molecule BMA: Benzylmethacrylate (following structural formula)

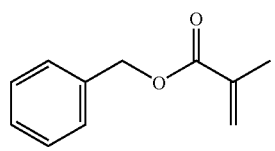

MMA: Methylmethacrylate (following structural formula)

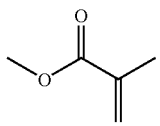

GMA: Glycidylmethacrylate
ADC: Allyldiglycolcarbonate (following structural formula)

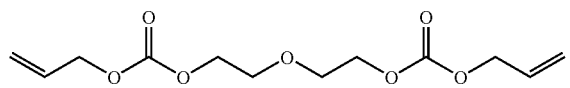 [SMILES: C=CCOC(=O)OCCOCCOC(=O)OCC=C]

DAP: Diallylphthalate (following structural formula)

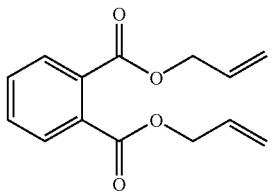 [SMILES: C=CCOC(=O)c1ccccc1C(=O)OCC=C]

EB: Urethaneacrylate EBECRYL 8402 made by Daicel-Cytec Company Ltd.
(d) compound having one or more thiol groups in a molecule
BMES: Bis(2-mercaptoethyl)sulfide
PETP: Pentaerythritoltetrakis(3-mercaptopropionate)
Abbreviations for the catalysts in Table 9
MI: N-methylimidazole
TBPB: Tetrabutylphosphoniumbromide
EBAC: Triethylbenzylammoniumchloride
TBP: Tributylphosphine
PBND: Tert-butylperoxyneodecanoate
POO: 1,1,3,3-tetramethylbutylperoxy-2-ethylhexanoate
PBO Tert-butylperoxy-2-ethylhexanoate
AIBN: Azobisisobutylonitrile
BE: Boron trifluoride-ethylether complex

Comparative Example 14

90 parts by weight of bis(β-epithiopropyl)sulfide, 10 parts by weight of benzylmethacrylate, 1.0 parts by weight of N-methylimidazole, and 1.0 parts by weight of 1,1,3,3-tetramethylbutylperoxy-2-ethylhexanoate were added together and stirred at room temperature to obtain a uniform liquid. Next, the resultant liquid was deaerated at 10 torr for 10 minutes, then filtrated and injected into a mold for lens, and the temperature thereof was raised from 30° C. to 110° C. over 22 hours in an oven in an attempt to polymerize/cure the substance. However, polymerization and curing did not occur. The results are shown in Table 10.

Comparative Examples 15 and 16

Substantially the same procedure as in Example 64 was performed using the compositions and the catalysts shown in Table 10, but polymerization and curing did not occur. The results are shown in Table 10.

TABLE 10

| Comparative Example | Composition (parts by weight) | Catalyst (parts by weight) | Refractive index | Abbe number |
|---|---|---|---|---|
| 14 | BES/BMA = 90/10 | MI/POO = 0/1.0 | Was not cured | |
| 15 | BES/ADC = 90/10 | MI/POO = 1.0/1.0 | Was not cured | |
| 16 | BES/BMA = 90/10 | TBPB/PBND = 0.2/0.5 | Was not cured | |

Abbreviations for the compounds in Table 10
BMA: Benzylmethacrylate
ADC: Allyldiglycolcarbonate
BES: Bis(β-epithiopropyl)sulfide
Abbreviations for the catalysts in Table 10
PBND: Tert-butylperoxyneodecanoate
MI: N-methylimidazole
POO: 1,1,3,3-tetramethylbutylperoxy-2-ethylhexanoate
TBPB: Tetrabutylphosphoniumbromide

Example 77

To 82 parts by weight of thioglycidylmethacrylate as (a) a compound having one or more of any group selected from the group consisting of an acryloyl group, a methacryloyl group, an allyl group and a vinyl group and one or more β-epithiopropyl groups in a molecule and 18 parts by weight of m-xylylenediamine as (e) a compound having one or more amino groups in a molecule while having no heterocyclic ring, 1.0 parts by weight of N-methylimidazole and 1.0 parts by weight of tert-butylperoxyneodecanoate as catalysts were added. These components were stirred at room temperature to obtain a uniform liquid. Next, the resultant liquid was deaerated at 10 torr for 10 minutes, then filtrated, injected into a mold for lens, and polymerized and cured by raising the temperature from 30° C. to 120° C. over 22 hours in an oven. Then, the resultant substance was removed from the mold and heated at 110° C. for 1 hour to be annealed. The optical properties, an IR value, and YI values before and after the light resistance test were measured. The results are shown in Table 11.

Examples 78 through 84

Lenses were obtained by polymerization and curing performed in substantially the same manner as in Example 77 using the compositions and the catalysts shown in Table 11. The optical properties, an IR value, and YI values before and after the light resistance test were measured. The results are shown in Table 11.

TABLE 11

| Example | Composition (parts by weight) | Catalyst (parts by weight) | Refractive index | Abbe number | Amount of remaining β-epithiopropyl groups | Light resistance |
|---|---|---|---|---|---|---|
| 77 | TGMA/MXDA = 82/18 | MI/POO = 1.0/1.0 | 1.59 | 40 | ○ | ○ |
| 78 | TGMA/BAC = 90/10 | MI/POO = 1.0/1.0 | 1.57 | 45 | ○ | ○ |
| 79 | ATGE/NBDA = 90/10 | MI/POO = 1.0/1.0 | 1.58 | 44 | ○ | ○ |
| 80 | TGMA/DACM = 90/10 | MI/POO = 1.0/1.0 | 1.57 | 45 | ○ | ○ |
| 81 | ATGE/DAB = 90/10 | MI/POO = 1.0/1.0 | 1.58 | 44 | ○ | ○ |
| 82 | EDTMS/PA = 90/10 | MI/POO = 1.0/1.0 | 1.59 | 42 | ○ | ○ |
| 83 | TGMA/MXDA/PETP = 90/5/5 | MI/POO = 1.0/1.0 | 1.59 | 42 | ○ | ○ |
| 84 | ATGE/BAC/BMES = 90/5/5 | MI/POO = 1.0/1.0 | 1.60 | 42 | ○ | ○ |

Abbreviations for the compounds in Table 11
(a) compound having one or more of any group selected from the group consisting of an acryloyl group, a methacryloyl group, an allyl group and a vinyl group and one or more β-epithiopropyl groups in a molecule
TGMA: Thioglycidylmethacrylate
ATGE: Allylthioglycidylether
EPTMS: 3- or 4-(β-epithiopropylthiomethyl)styrene
(e) compound having one or more amino groups in a molecule while having no heterocyclic ring
MXDA: m-xylylenediamine (following structural formula)

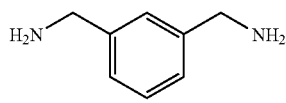

BAC: 1,3-bisaminomethylcyclohexane (following structural formula)

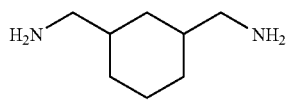

NBDA: Norbornenediamine (following structural formula)

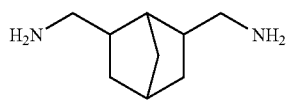

DACM: 4,4'-diaminodicyclohexylmethane (following structural formula)

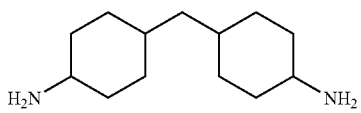 [SMILES: NC1CCC(CC2CCC(N)CC2)CC1]

DAB: 1,4-diaminobutane (following structural formula)

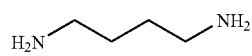

PA: n-propylamine (following structural formula)

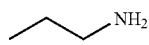

(d) compound having one or more thiol groups in a molecule
BMES: Bis(2-mercaptoethyl)sulfide
PETP: Pentaerythritoltetrakis(3-mercaptopropionate)
Abbreviations for the catalysts in Table 11
MI: N-methylimidazole
POO: 1,1,3,3-tetramethylbutylperoxy-2-ethylhexanoate Comparative Examples 17 through 19

Lenses were obtained by polymerization and curing performed in substantially the same manner as in Example 77 using the compositions and the catalysts shown in Table 12. The optical properties, an IR value, and YI values before and after the light resistance test were measured. The results are shown in Table 12.

TABLE 12

| Comparative example | Composition (parts by weight) | Catalyst (parts by weight) | Refractive index | Abbe number | Amount of remaining β-epithiopropyl groups | Light resistance |
|---|---|---|---|---|---|---|
| 17 | BES = 100 | TBPB = 0.1 | 1.71 | 36 | ○ | X |
| 18 | BEPD = 100 | TBPB = 0.1 | 1.71 | 36 | ○ | X |
| 19 | BEPD/MXDA = 90/10 | TBPB = 0.1 | 1.69 | 35 | X | X |

Abbreviations for the compounds in Table 12
BES: Bis(β-epithiopropyl)sulfide
BEPD: 2,5-bis(β-epithiopropylthiomethyl)-1,4-dithiane
MXDA: m-xylylenediamine
Abbreviation for the catalysts in Table 12
TBPB: Tetrabutylphosphoniumbromide

The invention claimed is:

1. A resin composition for an optical member, comprising (a) a compound having one or more of any group selected from the group consisting of an acryloyl group, a methacryloyl group, an allyl group and a vinyl group and one or more β-epithiopropyl groups in a molecule
wherein (a) the compound is represented by the following formula (1)

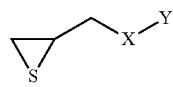

in which X represents $O(CH_2)_n$, $S(CH_2)_n$ or $(CH_2)_n$ and n is an integer of from 0 to 6; and Y represents an acryloyl group, a methacryloyl group, an ally group or a vinyl group.

2. The composition for an optical member according to claim 1, further comprising at least one compound selected from (b) a compound having one or more β-epithiopropyl groups in a molecule while having no polymerizable unsaturated bond group, (c) an inorganic compound having a sulfur atom and/or a selenium atom, (d) a compound having one or more thiol groups in a molecule, (e) a compound having one or more amino groups in a molecule while having no heterocyclic ring, and (f) a compound having one or more of at least one group selected from the group consisting of a vinyl group, an acryloyl group, a methacryloyl group and an allyl group in a molecule.

3. The composition for an optical member according to claim 1, comprising (d) a compound having one or more thiol groups in a molecule as an indispensable component, and further comprising at least one compound selected from (b) a compound having one or more β-epithiopropyl groups in a molecule while having no polymerizable unsaturated bond group, (c) an inorganic compound having a sulfur atom and/or a selenium atom, (e) a compound having one or more amino groups in a molecule while having no heterocyclic ring, and (f) a compound having one or more of at least one group selected from the group consisting of a vinyl group, an acryloyl group, a methacryloyl group and an allyl group in a molecule.

4. The composition for an optical member according to claim 1, wherein (a) the compound of formula I is thioglycidyl methacrylate represented by the following structural formula

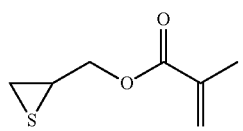

5. The composition for an optical member according to claim 1, wherein (a) the compound of formula I is allylthioglycidylether represented by the following structural formula

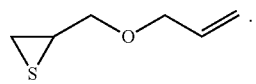

6. The composition for an optical member according to claim 2, wherein (b) the compound having one or more β-epithiopropyl groups in a molecule while having no polymerizable unsaturated bond group is a compound represented by the following formula (2):

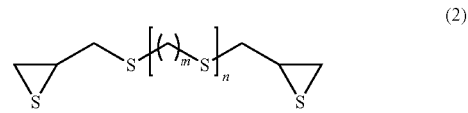

(in the formula, m represents an integer of 0 to 4; and n represents an integer of 0 to 2).

7. The composition for an optical member according to claim 2, wherein (b) the compound having one or more β-epithiopropyl groups in a molecule while having no polymerizable unsaturated bond group is bis(β-epithiopropyl) sulfide or bis(β-epithiopropyl) disulfide respectively represented by the following structural formulas

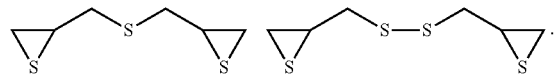

8. The composition for an optical member according to claim 2, wherein (c) the inorganic compound having a sulfur atom and/or a selenium atom is sulfur or carbon disulfide.

9. The composition for an optical member according to claim 2, wherein (d) the compound having one or more thiol groups in a molecule is a compound having two or more and six or less thiol groups in a molecule.

10. The composition for an optical member according to claim 2, wherein (d) the compound having one or more thiol groups in a molecule is at least one selected from the group consisting of bis(2-mercaptoethyl)sulfide, 2,5-bis(2-mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis (mercaptomethylthio)propane.

11. A resin composition for an optical member comprising (a) a compound having one or more of a group selected from the group consisting of an acryloyl group, a methacryloyl group, an alkyl group and a vinyl group and one or more β-epithiopropyl group in a molecule, and (e) a compound having one or more amino groups in a molecule while having no heterocyclic ring, wherein (e) the compound is at least one selected from the group consisting of o-, m- or p-xylylenediamine, 1,2-bisaminomethylcyclohexane, 1,3-bisaminomethylcyclohexane, 1,4-bisaminomethylcyclohexane, and bisaminomethylnorbornene.

12. A resin composition for an optical member comprising (a) a compound having one or more of a group selected from the group consisting of an acryloyl group, a methacryloyl group, an alkyl group and a vinyl group and one or more β-epithiopropyl group in a molecule, and (f) a compound having one or more of at least one group selected from the group consisting of a vinyl group, an acryloyl group, a methacryloyl group and an sllyl group in a molecule wherein (f) the compound is at least one selected from the group consisting of styrene, α-methylstyrene, divinylbenzene, methyl (meth)acrylate, butyl(meth)acrylate, isobutyl(meth)acrylate, 2-hydroxyethyl(meth)acrylate, benzyl(meth)acrylate, glycidyl(meth)acrylate, 2-ethylhexyl(meth)acrylate, cyclohexyl (meth)acrylate, allyl(meth)acrylate, and a urethane(meth) acrylate compound having a (meth)acryloyl group.

13. The composition for an optical member according to claim 2, which contains 1 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 99% by weight of (b) the compound having one or more β-epithiopropyl groups in a molecule while having no polymerizable unsaturated bond group.

14. The composition for an optical member according to claim 2, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (c) the inorganic compound having a sulfur atom and/or a selenium atom.

15. The composition for an optical member according to claim 2, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (d) the compound having one or more thiol groups in a molecule.

16. The composition for an optical member according to claim 2, which contains 50 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 50% by weight of (e) the compound having one or more amino groups in a molecule while having no heterocyclic ring.

17. The composition for an optical member according to claim 2, which contains 1 to 99.9% by weight of (a) the compound having one or more of any group selected from the group consisting of an acryloyl group, a methacryloyl group, an allyl group and a vinyl group and one or more β-epithiopropyl groups in a molecule and 0.1 to 99% by weight of (f) the compound having one or more of at least one group selected from the group consisting of a vinyl group, an acryloyl group, a methacryloyl group and an ally group in a molecule.

18. The composition for an optical member according to claim 2, which is obtained by preliminarily reacting (a) the compound having one or more of any group selected from the group consisting of an acryloyl group, a methacryloyl group, an allyl group and a vinyl group and one or more β-epithiopropyl groups in a molecule and (c) the inorganic compound having a sulfur atom and/or a selenium atom in the presence of an imidazole-based compound or a phosphine-based compound such that 10% or more and 90% or less of the inorganic compound having a sulfur atom and/or a selenium atom is reacted.

19. An optical member obtained by polymerizing and curing the composition for an optical member according to claim 1 in the presence of a curing catalyst.

20. The optical member according to claim 19, wherein the curing catalyst is at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, metal halides, peroxides, and azo compounds.

21. The optical member according to claim 19, wherein the curing catalyst is a combination of at least one compound selected from the group consisting of amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides; and at least one compound selected from peroxides and azo compounds.

22. The optical member according to claim 19, wherein the curing catalyst is contained in an amount of 0.002 parts by weight to 6 parts by weight with respect to 100 parts by weight of the compound for an optical member.

* * * * *